(12) United States Patent
Matsumura et al.

(10) Patent No.: US 10,609,652 B2
(45) Date of Patent: Mar. 31, 2020

(54) USER TERMINAL, RADIO BASE STATION AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/089,073

(22) PCT Filed: Mar. 29, 2017

(86) PCT No.: PCT/JP2017/012873
§ 371 (c)(1),
(2) Date: Sep. 27, 2018

(87) PCT Pub. No.: WO2017/170677
PCT Pub. Date: Oct. 5, 2017

(65) Prior Publication Data
US 2019/0150098 A1 May 16, 2019

(30) Foreign Application Priority Data
Mar. 31, 2016 (JP) .................... 2016-072046

(51) Int. Cl.
*H04W 52/24* (2009.01)
*H04W 52/14* (2009.01)
(Continued)

(52) U.S. Cl.
CPC ....... *H04W 52/241* (2013.01); *H04W 52/143* (2013.01); *H04W 52/242* (2013.01);
(Continued)

(58) Field of Classification Search
CPC ............. H04W 52/143; H04W 52/146; H04W 52/221; H04W 52/228; H04W 52/24;
(Continued)

(56) References Cited

U.S. PATENT DOCUMENTS 9,942,862 B2 * 4/2018 Takeda ................ H04W 52/243
2002/0082038 A1 * 6/2002 Mochizuki ............ H04W 52/40
455/522

(Continued)

FOREIGN PATENT DOCUMENTS

JP 2010518784 A 5/2010
JP 2014143605 A 8/2014
(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Yuwen Pan
*Assistant Examiner* — Paul P Tran
(74) *Attorney, Agent, or Firm* — Osha Liang LLP

(57) ABSTRACT

The present invention is designed to improve DL received quality in future radio communication systems. According to the present invention, a user terminal has a receiving section that receives a downlink (DL) data channel, which is demodulated using a user terminal-specific reference signal, a transmission section that transmits a transmission power control (TPC) command, which is used to control transmission power of the DL data channel and/or the reference signal; and a control section that controls transmission of the TPC command.

6 Claims, 22 Drawing Sheets

(51) Int. Cl.
*H04W 72/04* (2009.01)
*H04W 52/28* (2009.01)
*H04W 52/32* (2009.01)
*H04W 52/36* (2009.01)

(52) U.S. Cl.
CPC ......... *H04W 52/283* (2013.01); *H04W 52/32* (2013.01); *H04W 52/325* (2013.01); *H04W 52/367* (2013.01); *H04W 72/0406* (2013.01)

(58) Field of Classification Search
CPC ............. H04W 52/241; H04W 52/322; H04W 52/325; H04W 52/34; H04W 52/367; H04W 52/54; H04W 72/0413; H04W 72/0473; H04W 52/242; H04W 52/283; H04W 52/32; H04W 72/0406
USPC ........................................................ 455/522
See application file for complete search history.

(56) References Cited

U.S. PATENT DOCUMENTS

| | | | |
|---|---|---|---|
| 2005/0239409 A1 | 10/2005 | Oh et al. | |
| 2008/0049710 A1* | 2/2008 | Zeira | H04W 52/08 370/345 |
| 2008/0069020 A1* | 3/2008 | Richardson | H04L 1/1887 370/311 |
| 2008/0200202 A1* | 8/2008 | Montojo | H04W 52/06 455/522 |
| 2012/0224555 A1* | 9/2012 | Lee, II | H04W 52/143 370/329 |
| 2014/0177532 A1* | 6/2014 | Kim | H04W 52/245 370/328 |
| 2014/0198747 A1* | 7/2014 | Ouchi | H04L 5/0053 370/329 |
| 2015/0372851 A1 | 12/2015 | Kakishima et al. | |
| 2017/0078973 A1 | 3/2017 | Ohwatari et al. | |
| 2017/0238261 A1* | 8/2017 | Benjebbour | H04W 16/28 370/329 |

FOREIGN PATENT DOCUMENTS

| | | |
|---|---|---|
| WO | 2005/107097 A1 | 11/2005 |
| WO | 2016/027556 A1 | 2/2016 |

OTHER PUBLICATIONS

Written Opinion issued in PCT/JP2017/012873, dated Jun. 20, 2017 (7 pages).
International Search Report issued in PCT/JP2017/012873, dated Jun. 20, 2017 (5 pages).
Extended European Search Report issued in counterpart European Patent Application No. 17775211.0, dated Oct. 9, 2019 (10 pages).

* cited by examiner

| TPC Command Field in UCI | COMMAND VALUE 1 [dB] | COMMAND VALUE 2 [dB] |
|---|---|---|
| 1 | -1 | -3 |
| 2 | 0 | -1 |
| 3 | +1 | 0 |
| 4 | +3 | +1 |

FIG. 3

| REFERENCE VALUE MODIFICATION COMMAND | COMMAND VALUE 1 [dB] | COMMAND VALUE 2 [dB] |
| --- | --- | --- |
| 1 | −1 | −3 |
| 2 | 0 | −1 |
| 3 | +1 | 0 |
| 4 | +3 | +1 |

FIG. 5

| ACCUMULATED VALUE OF TPC COMMANDS PER UE | MODIFICATION REQUEST VALUE (dB) |
|---|---|
| 10 OR MORE | −3 |
| 6 OR MORE AND LESS THAN 10 | −1 |
| 3 OR MORE AND LESS THAN 6 | 0 |
| 0 OR MORE AND LESS THAN 3 | +1 |

FIG. 10

| ACCUMULATED VALUE OF TPC COMMANDS PER UE (dB) | MODIFICATION REQUEST VALUE (dB) | | | |
|---|---|---|---|---|
| | -3 | -1 | 0 | +1 |
| 10 OR MORE | 0 | 0 | 0 | +1 |
| 6 OR MORE AND LESS THAN 10 | 0 | 0 | 0 | +1 |
| 3 OR MORE AND LESS THAN 6 | -1 | 0 | 0 | +1 |
| 0 OR MORE AND LESS THAN 3 | -3 | -1 | 0 | +1 |

FIG. 11

| FIELD NAME IN MODIFICATION REQUEST MESSAGE | NUMBER OF BITS |
|---|---|
| MODIFICATION REQUEST VALUE (EXAMPLE: -3, -1, 0, +1 dB) | 2bit |
| UE-ID | 16bit |
| FREQUENCY BAND ID | 4bit |
| CELL ID (SECTOR ID) | 8bit |

FIG. 15

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, successor systems of LTE (referred to as, for example, LTE-A (LTE-Advanced), FRA (Future Radio Access), 5G (5th generation mobile communication system), 5G+(5G plus), New-RAT (Radio Access Technology) and so on) are also under study for the purpose of achieving further broadbandization and increased speed beyond LTE.

In existing LTE systems (for example, Rel. 8), a user terminal (UE: User Equipment) can assume that, in the downlink (DL), a DL data channel is transmitted with constant transmission power. The user terminal demodulates the DL data channel (for example, PDSCH (Physical Downlink Shared CHannel)) using a cell-specific reference signal (CRS) (which is common to user terminals in a cell). The CRS is transmitted with constant transmission power, so that, by transmitting the DL data channel with constant transmission power (for example, with the same transmission power as that of the CRS, or with a predetermined power gap), it is possible to demodulate the DL data channel using the CRS (especially when a modulation scheme, in which the amplitude of received signals provides information, such as 16QAM (Quadrature Amplitude Modulation), 64QAM and others, is used).

CITATION LIST

Non-Patent Literature

Non-Patent Literature 1: 3GPP TS36.300 V8.12.0, "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In existing LTE systems, a DL data channel is demodulated using a CRS, so that it is possible to assume that the DL data channel is transmitted with constant transmission power to all user terminals in a cell. Meanwhile, the propagation loss (PL: Path Loss) between a radio base station (eNB: eNodeB) and user terminals and/or the interference which user terminals receive from nearby cells vary per user terminal, so that, when it is assumed that a DL data channel has constant transmission power, cases may occur where the received quality in the DL (hereinafter referred to as "DL received quality") deteriorates significantly depending on the location in the cell.

In future radio communication systems (for example, 5G), it is conceivable that radio base stations are provided more densely for the purpose of achieving higher communication capacity than existing LTE systems (for example, communication capacity 1000 times that of existing LTE systems). It then follows that future radio communication systems may anticipate greater interference from nearby cells, and this may lead to more cases where DL received quality deteriorates more severely.

The present invention has been made in view of the above, and it is therefore an object of the present invention to provide a user terminal, a radio base station and a radio communication method that can achieve improved DL received quality in future radio communication systems.

Solution to Problem

According to one aspect of the present invention, a user terminal has a receiving section that receives a downlink (DL) data channel, which is demodulated using a user terminal-specific reference signal, and a transmission section that transmits a transmission power control (TPC) command, which is used to control transmission power of the DL data channel and/or the reference signal, and a control section that controls transmission of the TPC command.

Advantageous Effects of Invention

According to the present invention, it is possible to achieve improved DL received quality in future radio communication systems.

BRIEF DESCRIPTION OF DRAWINGS

FIG. 3 is a diagram to show examples of TPC commands according to the first aspect;

FIG. 5 is a diagram to show examples of reference value modification commands according to the second aspect;

FIG. 10 is a diagram to show examples of reference value modification request values according to the fourth aspect;

FIG. 11 is a diagram to show examples of judging whether to modify the reference value, according to the fourth aspect;

FIG. 15 is a diagram to show an example of a modification request message according to the fourth aspect;

DESCRIPTION OF EMBODIMENTS

Figure 1:
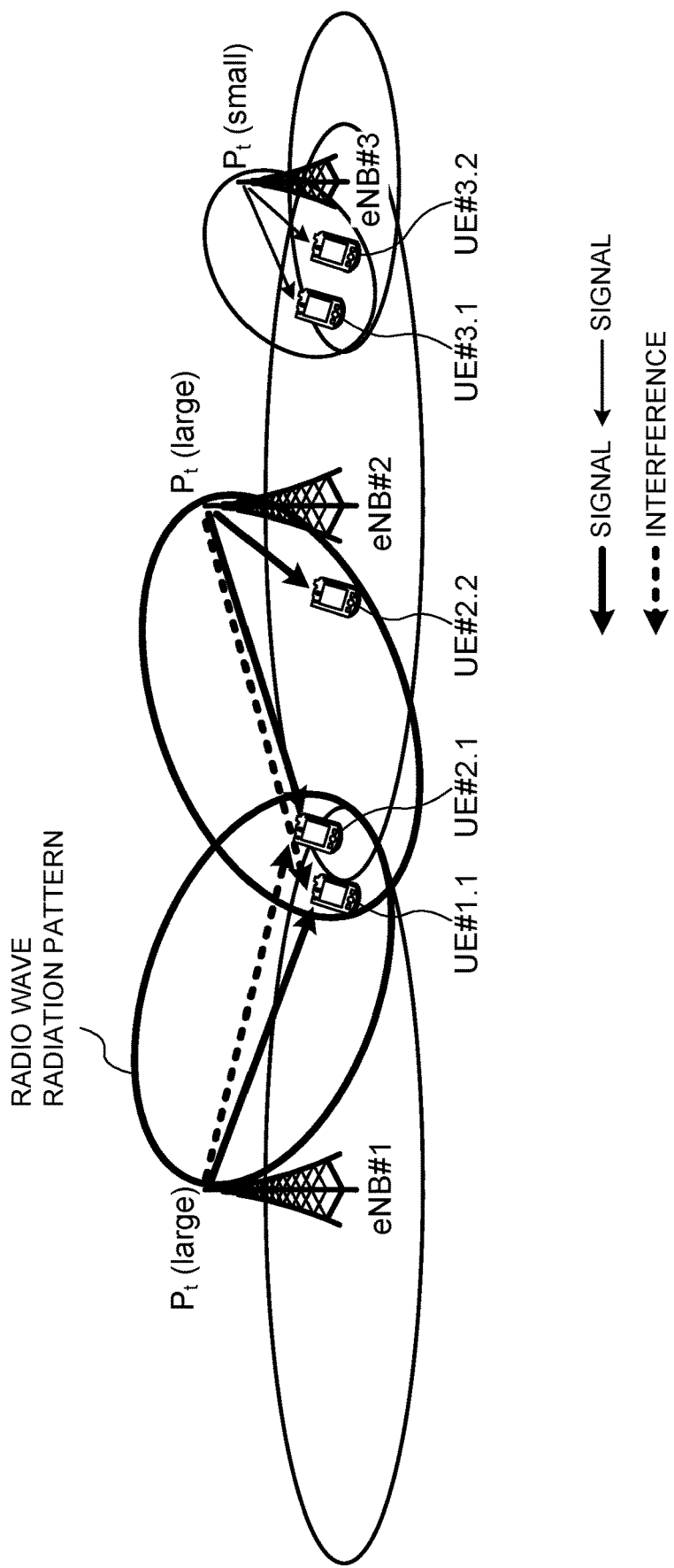
FIG. 1 is a diagram to show an example of DL communication in an existing LTE system.

FIG. 1 is a diagram to show an example of DL communication in an existing LTE system. The LTE system shown in FIG. 1 is comprised of radio base stations (eNBs) #1 and #2, which cover relatively wide areas (also referred to as "macro base stations"), and radio base station (eNB) #3, which covers a relatively narrow area (also referred to as a "micro base station," a "small base station," a "femto base station," etc.). Radio base stations #1 and #2 transmit DL signals with relatively large transmission power $P_T$ ("large"). On the other hand, radio base station #3 transmits DL signals with smaller transmission power $P_T$ ("small") than radio base stations #1 and #2.

In FIG. 1, each user terminal can assume that the transmission power of DL signals from each radio base station is constant. To be more specific, each user terminal assumes that the transmission power of a DL data channel is equal to (or has a predetermined gap from) that of a CRS, which is transmitted with constant transmission power, and, accordingly, estimates DL channel gain (which may include propagation loss, shadowing loss, etc.) based on the received power of the CRS, and demodulates the DL data channel based on this channel gain.

In this way, the existing LTE system does not perform transmission power control for the DL data channel and assumes that the transmission power of the DL data channel is constant, thereby enabling demodulation of the DL data channel using a CRS (especially when a modulation scheme, in which the amplitude of received signals provides information, such as 16QAM, 64QAM and others, is used). Meanwhile, when it is assumed that a DL data channel has constant transmission power, cases may occur where DL received quality deteriorates significantly depending on the location in the cell.

For example, referring to FIG. 1, the DL received quality from radio base station #1 to cell-edge user terminal (UE) #1.1 deteriorates due to an interference signal from radio base station #2. Also, the DL received quality from radio base station #2 to cell-edge user terminal #2.1 deteriorates due to an interference signal from radio base station #1. Meanwhile, the DL received quality from radio base station #2 to user terminal #2.2 in the cell center is better than the DL received quality of user terminal #2.1.

Now, in future radio communication systems (for example, 5G), it is conceivable that radio base stations are provided more densely for the purpose of achieving higher communication capacity than existing LTE systems (for example, communication capacity 1000 times that of existing LTE systems). It then follows that future radio communication systems may anticipate greater interference from nearby cells, and this may lead to more cases where DL received quality deteriorates more severely in user terminals.

Therefore, in future radio communication systems, it is desirable to transmit a DL data channel with different transmission power per user terminal (that is, control the transmission power of the DL data channel) so that the required DL received quality is fulfilled in each user terminal.

Therefore, the present inventors have come up with the idea of demodulating a DL channel by using user terminal-specific reference signals, instead of cell-specific CRSs, so as to control the transmission power of the DL data channel and the transmission power of the user terminal-specific reference signals together.

Now, the radio communication method according to one embodiment of the present invention will be described below. Note that, in the present embodiment, a subframe (Transmission Time Interval (TTI)) may be 1 ms as in existing LTE systems, may be shorter than 1 ms, or may be longer than 1 ms.

Also, a user terminal-specific reference signal that is used to demodulate a DL data channel, according to the present embodiment, may be referred to as a "demodulation reference signal," a "DM-RS (DeModulation-Reference Signal)," and so on. Hereinafter, a user terminal-specific reference signal like this will be referred to as a "DM-RS."

(First Aspect)

In accordance with a first aspect of the present invention, transmission power control for a DL data channel and/or a DM-RS (user terminal-specific reference signal) that is used to demodulate this DL data channel will be described. In the first aspect, a user terminal receives a DL data channel, which is demodulated using a DM-RS, and transmits a transmission power control (TPC) command. The radio base station controls the transmission power of the DL data channel and/or the DM-RS based on the TPC command.

Figure 2:
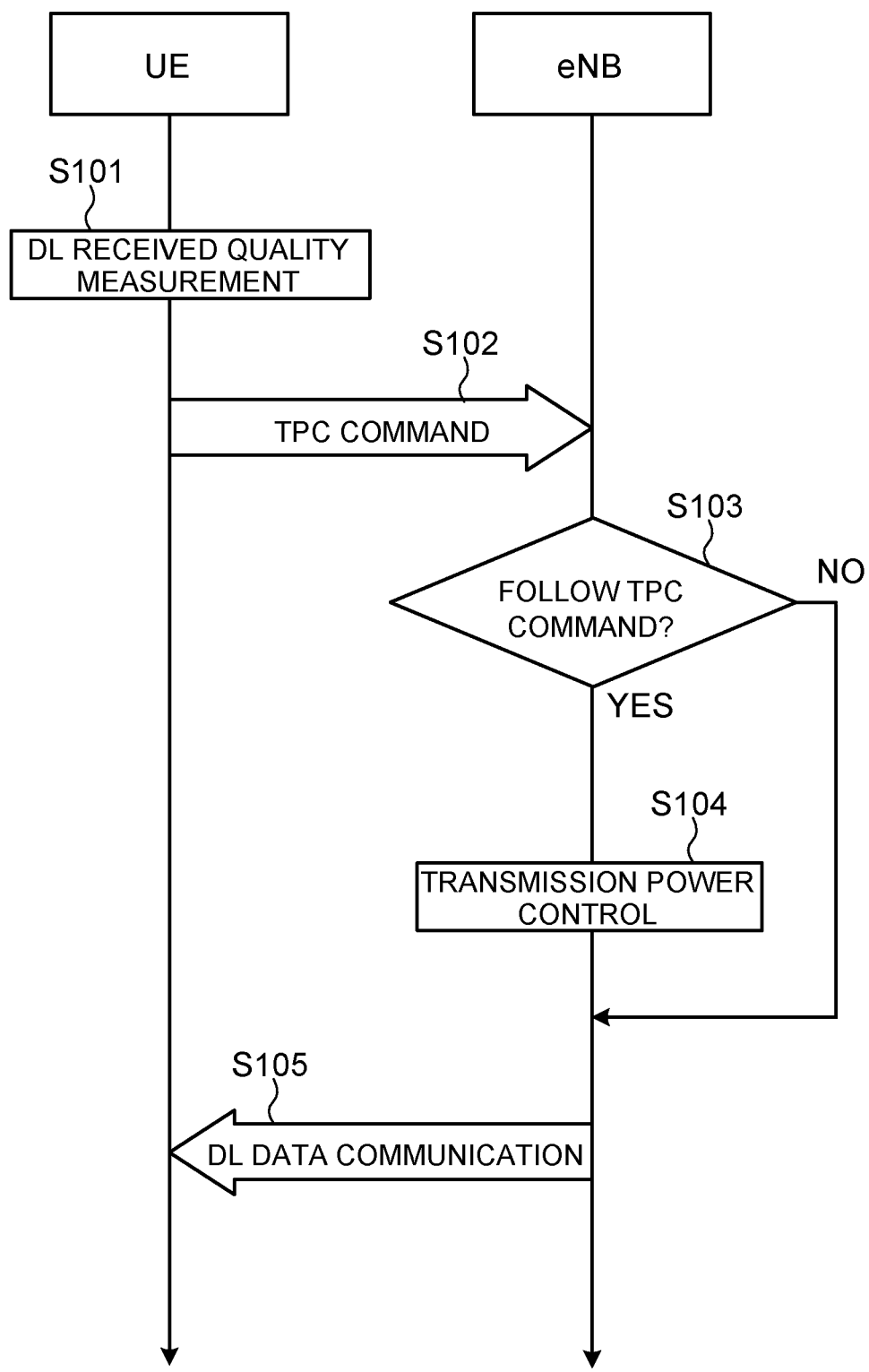
FIG. 2 is a diagram to show an example of DL transmission power control according to a first aspect of the present invention.

FIG. 2 is a diagram to show an example of the DL transmission power control according to the first aspect. In step S101 of FIG. 2, the user terminal measures DL received quality, and generates (calculates) a TPC command based on this DL received quality. This DL received quality may be measured based on, for example, at least one of a DL data channel, a DM-RS, a channel state information reference signal (CSI-RS) and a CRS. Which DL signal's DL received quality is used to generate the TPC command may be configured from the radio base station to the user terminal, via higher layer signaling.

To be more specific, the user terminal generates a TPC command based on the result of comparing the DL received quality with a reference value. The user terminal may configure the closest value to the difference between the DL received quality and the reference value in a TPC command. For example, if the reference value is 15 dB and the DL received quality is 12 dB, the user terminal can generate a TPC command representing +3 dB.

In step S102, the user terminal transmits the generated TPC command to the radio base station using a UL control channel or a UL data channel. To be more specific, a TPC command may be transmitted as a part of UCI, every time a UL control channel or a UL data channel is transmitted. Alternatively, a TPC command may be transmitted as a part of UCI when a predetermined timer is expired and transmission of a UL control channel or a UL data channel takes place. That is, a TPC command may be transmitted through physical layer signaling.

Alternatively, a TPC command may be transmitted as part of control information (for example, MAC-CEs (Media Access Control-Control Elements)) that is transmitted in a UL data channel. That is, a TPC command may be transmitted through MAC signaling, which is higher than physical layer signaling.

In step S103, the radio base station judges whether or not to follow the TPC command received from the user terminal. For example, if the DL received quality is measured using a CRS, the radio base station does not have to perform transmission power control based on this TPC command. Meanwhile, when this DL received quality is measured one of a DL data channel, a DM-RS and a CSI-RS, the radio base station may decide to perform transmission power control based on this TPC command.

In step S104, the radio base station controls the transmission power of the DL data channel and/or the DM-RS based on the TPC command from the user terminal. To be more specific, the radio base station may control the transmission power of the DL data channel and/or the DM-RS based on at least one of the TPC command, the maximum transmission power of the DL data channel, the bandwidth (for example, the number of resource blocks (PRBs)) allocated to the DL data channel addressed to the user terminal, and the power ratio (for example, the ratio of EPRE (Energy Per Resource Element)) between the DL data channel and the DM-RS.

For example, the radio base station may control the transmission power $P(u)_{PDSCH}$ of a DL data channel for a user terminal u in subframe i+k (K≥0), based on a TPC command received in a subframe i, based on following equation 1 or equation 2. Note that, equations 1 and 2 are merely examples, and other parameters that are not shown in equations 1 and 2 may be taken into consideration to determine the transmission power of the DL data channel.

$$P(u)_{PDSCH} = \min(P_{MAX}, P_{PDSCH} + 10\log_{10}(M(u)_{PDSCH}) + f(u,i))$$ (Equation 1)

$$P(u)_{PDSCH} = \min(P_{MAX}, P_{PDSCH} + f(u,i))$$ (Equation 2)

Here, $P_{MAX}$ is the maximum transmission power of the DL data channel. $M(u)_{PDSCH}$ is the bandwidth (for example, the number of PRBs) allocated to the DL data channel addressed to the user terminal. $P_{PDSCH}$ is transmission power determined based on the power ratio between the DL data channel and the DM-RS. f(u, i) is the accumulated value of command values indicated by TPC command values from the user terminal u in the subframe i. Note that, if TPC commands are not accumulated, the command value indicated by the TPC command value in subframe i may be used as f(u, i) on an as-is basis.

FIG. 3 is a diagram to show examples of TPC commands according to the first aspect. The TPC commands indicate values for commanding an increase or decrease in transmission power. For example, in FIG. 3, the TPC commands {1, 2, 3, 4} indicate {−1, 0, +1, +3} or {−3, −1, 0, +1}, respectively. Which of command value 1 and command value 2 a TPC command indicates may be determined based on, for example, the format of a UL control channel (for example, PUCCH format), or may be configured by higher layer signaling.

Note that the command values in FIG. 3 are simply examples, and are by no means limiting. Furthermore, FIG. 3 assumes a case where two-bit TPC commands are used, but TPC commands may be one bit, or may be three bits or more.

Also, the radio base station may determine the transmission power of the DM-RS based on the transmission power $P(u)_{PDSCH}$ of the DL data channel determined as described above. For example, the radio base station may set the transmission power of the DM-RS to the same value as the transmission power of the DL data channel, or to a value with a predetermined offset value (power gap).

In step S105 of FIG. 2, the radio base station transmits the DL data channel. Whether or not the transmission power of the DL data channel is controlled based on the TPC command may be explicitly reported to the user terminal, or may not be reported. For example, when explicit reporting is used, TPC command applicability information to indicate whether or not transmission power is controlled based on TPC commands may be included in DCI that allocates the DL data channel (for example, DL assignment). The user terminal may estimate the transmission power of the DL data channel from the radio base station based on this TPC command applicability information, and use the estimated transmission power to demodulate the DL data channel.

On the other hand, when explicit reporting is not used, the user terminal may measure the received quality of the DM-RS from the radio base station, estimate (blind estimation), from this received quality, whether its transmission power has been subjected to control based on TPC commands, and demodulate the DL data channel based on the estimated result.

As described above, according to the first aspect, the transmission power of the DL data channel is controlled based on user terminal-specific TPC commands, so that improved DL received quality can be achieved in future radio communication systems. Also, the DL data channel is demodulated by using the DM-RS, and the transmission power of the DM-RS is controlled in accordance with the DL data channel, so that, even when transmission power control for the DL data channel is carried out, it is possible to demodulate the DL data channel appropriately.

In the first aspect, the accumulated value of command values indicated by TPC commands (accumulated value of TPC commands) may be re-set when at least one of following conditions (1) to (3) is fulfilled. The accumulated value, after re-set, may be set to 0.

(1) When the user terminal receives a response signal (for example, a random access channel (RACH) response) from the radio base station in initial access procedures (for example, random access (RA) procedures).

(2) When the user terminal transitions to idle state (for example, RRC (Radio Resource Control)-idle state).

(3) When the user terminal transitions to discontinuous reception (DRX: Discontinuous Reception) state.

Also, the TPC command-based transmission power control according to the first aspect does not need to be applied to DL control channels, synchronization signals (SSs) or others.

(Second Aspect)

In accordance with a second aspect of the present invention, control for modifying the reference value for DL received quality, which is used to generate TPC commands, will be described. According to the second aspect, the user terminal may receive commands for modifying the reference value for DL received quality (hereinafter referred to as "reference value modification commands") and generate TPC command based on the reference value controlled according to these reference value modification commands. Note that the second aspect can be combined with the first aspect, and, below, differences from the first aspect will be primarily described.

Figure 4:
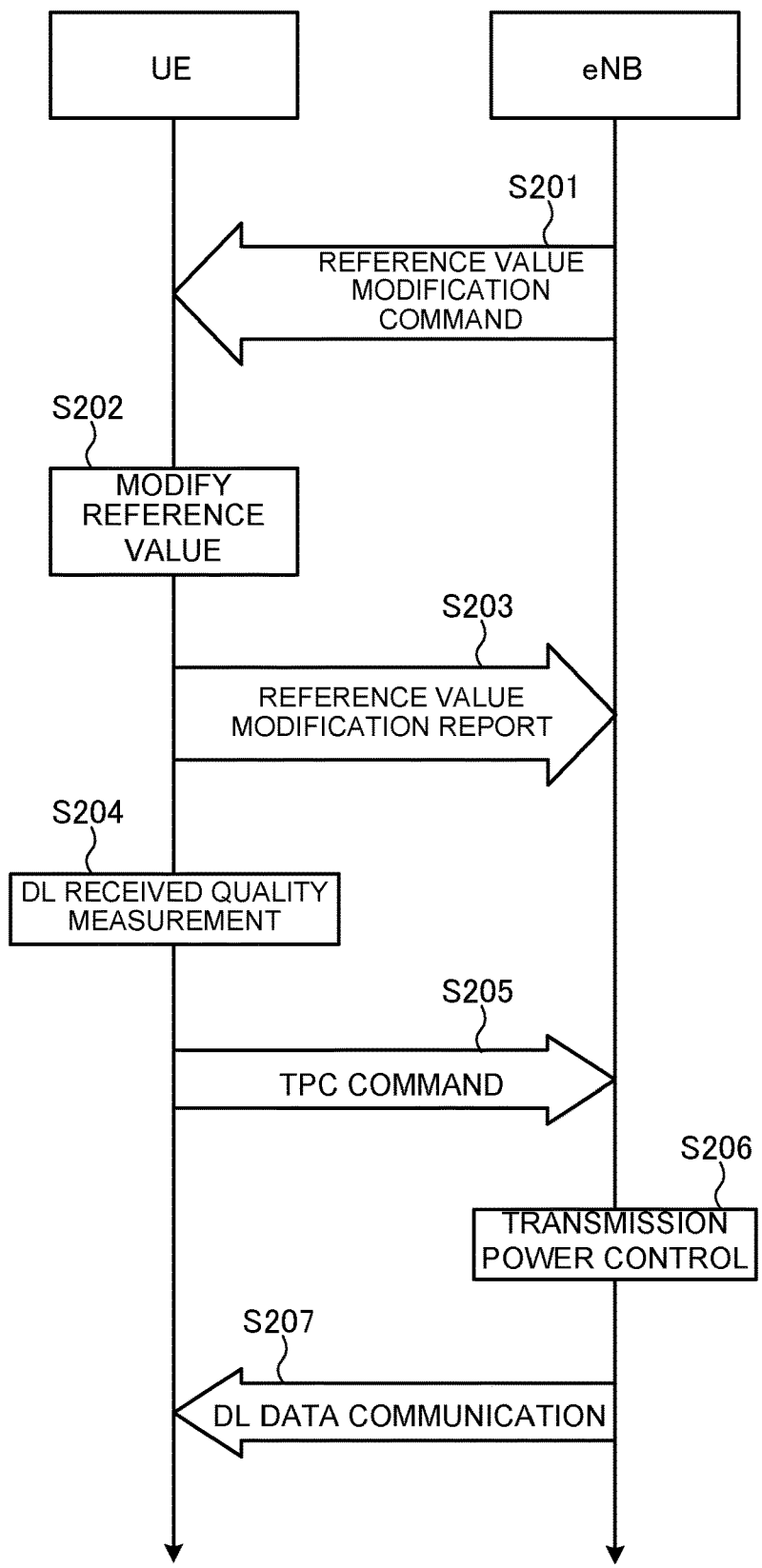
FIG. 4 is a diagram to show an example of control for modifying the reference value for DL received quality according to a second aspect of the present invention.

FIG. 4 is a diagram to show an example of control for modifying the reference value for DL received quality according to the second aspect. In step S201 of FIG. 4, the radio base station transmits, to the user terminal, a command to order a change (modification) of the reference value for DL received quality (hereinafter referred to as "reference value modification command").

This reference value modification command may be transmitted in a DL control channel or a DL data channel, as part of the DCI. That is, this reference value modification command may be transmitted through physical layer signaling. Alternatively, the reference value modification command may be transmitted using one higher layer signaling out of MAC signaling, RRC signaling and broadcast information.

FIG. 5 is a diagram to show examples of reference value modification commands according to the second aspect. In FIG. 5, the reference value modification commands {1, 2, 3, 4} indicate {−1, 0, +1, +3} or {−3, −1, 0, +1}, respectively. Which of command value 1 and command value 2 a reference value modification command indicates may be determined based on, for example, the format of the DCI where the reference value modification command is included (for example, DCI format), or may be configured by higher layer signaling.

Note that the command values in FIG. 5 are simply examples, and are by no means limiting. Furthermore, although FIG. 5 assumes a case where two-bit reference value modification commands are used, the reference value modification commands may be one bit, or may be three bits or more.

In step S202 of FIG. 4, the user terminal controls the reference value for DL received quality based on reference value modification commands from the radio base station. To be more specific, the user terminal may add the command values indicated by reference value modification commands to the reference value. For example, if the user terminal receives the reference value modification command "1" and the reference value is 15 dB, the user terminal can add the command value "−3" (see the column "Command Value 2" in FIG. 5), indicated by the reference value modification command "1," to 15 dB, thereby modifying this reference value to 12 dB.

In step S203, the user terminal transmits, to the radio base station, information that indicates whether or not the reference value for DL received quality has been modified (reference value modification report). To be more specific, the user terminal may configure a value that indicates whether or not the reference value has been modified, in a specific field in UCI. For example, if the user terminal modifies the reference value, the user terminal may configure "1" ("modified") in this specific field, or, if the user terminal has not modified the reference value, the user terminal may configure "0" ("unmodified") in the specific field.

Step S203 of FIG. 4 may be omitted. Since steps S204, S205, S206, and S207 of FIG. 4 are the same as steps S101, S102, S104, and S15 of FIG. 2, their description will be omitted. Also, although FIG. 4 does not show step S103 in FIG. 2, obviously, whether or not to execute transmission power control in accordance with TPC commands can be judged.

As described above, according to the second aspect, the reference value for DL received quality is modified in the user terminal, so that the user terminal can generate TPC command more appropriately, and the transmission power of a DL data channel can be controlled more appropriately.

Note that, in the second aspect, the user terminal reports to the radio base station whether or not the reference value for DL received quality has been modified (step S203 of FIG. 4), the user terminal may transmit the latest reference value to the radio base station, instead of sending this reference value modification report.

The latest reference value may be transmitted as part of the UCI every time a UL control channel or a UL data channel is transmitted. Alternatively, this reference value may be transmitted as part of the UCI when a predetermined timer is expired and a UL control channel or a UL data channel is transmitted. Alternatively, the user terminal may transmit the latest reference value to the radio base station in response to a request from the radio base station. For example, the radio base station may include information that requests a report of the reference value, in DCI.

Also, according to the second aspect, the reference value for DL received quality may be re-set when at least one of following conditions (1) to (3) is fulfilled.

(1) When the user terminal receives a response signal (for example, a RACH response) from the radio base station in initial access procedures (for example, RA procedures).

(2) When the user terminal transitions to idle state (for example, RRC-idle state).

(3) When the user terminal transitions to discontinuous reception (DRX) state.

Note that the reference value, after re-set, may be a value that is reported from the radio base station through higher layer signaling of either RRC signaling or broadcast information, or may be a value that is configured independently in the user terminal.

(Third Aspect)

In accordance with a third aspect of the present invention, limitations on issue of TPC commands in the user terminal will be explained. According to the third aspect, when predetermined conditions are fulfilled, the user terminal may stop issuing (transmitting) TPC commands that order an increase in transmission power of a DL data channel and/or a DM-RS. Note that the third aspect can be combined with at least one of the first aspect and the second aspect, and, below, differences from the first aspect will be primarily described.

<First Example of Limitation>

In the first example of limitation, the user terminal judges whether or not to issue (transmit) TPC commands based on the accumulated value of TPC commands which the user terminal itself has issued (transmitted to the radio base station).

Figure 6:
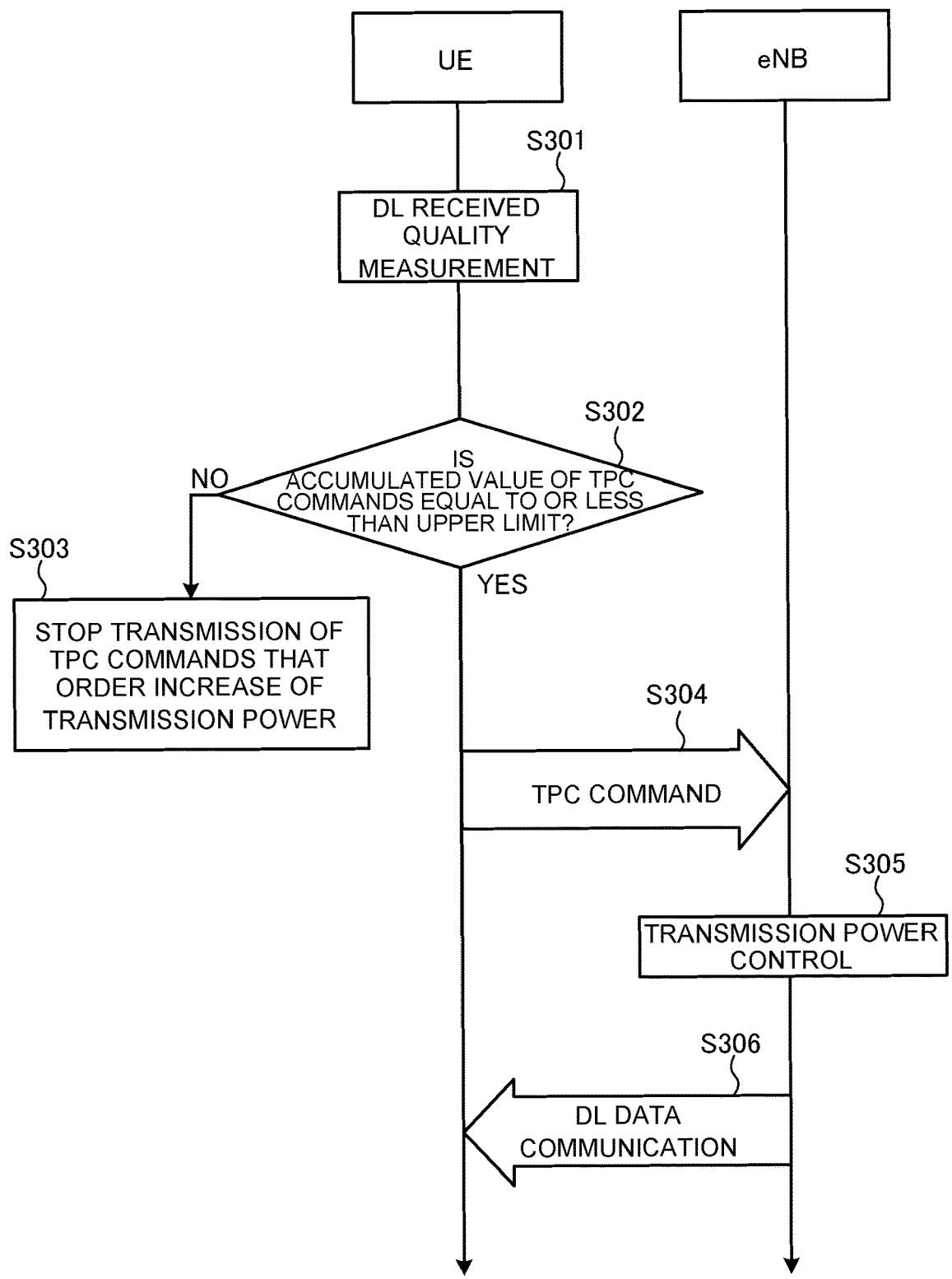
FIG. 6 is a diagram to show a first example of limiting issue of TPC commands, according to a third aspect of the present invention.

FIG. 6 is a diagram to show a first example of limiting issue of TPC commands, according to the third aspect. Since steps S301 and S305 to S306 of FIG. 6 are the same as steps S101 and S104 to S105 of FIG. 2, their description will be omitted. Also, in FIG. 6, the user terminal accumulates the TPC commands which the user terminal itself issues (transmits to the radio base station). The accumulated value of TPC commands may be re-set when at least one of conditions (1) to (3) described in the first aspect is fulfilled.

In step 302 of FIG. 6, the user terminal judges whether the accumulated value of TPC command that have been issued by the user terminal itself is less than or equal to an upper limit value. This upper limit value may be configured from the radio base station to the user terminal, for example, by higher layer signaling of either RRC signaling or broadcast information.

When the accumulated value of TPC commands exceeds the upper limit value (step S302: "NO"), in step S303, the user terminal stops issuing (transmitting) TPC commands that order an increase in transmission power. Note that, even when the accumulated value of TPC commands exceeds the upper limit value, the user terminal may transmit a TPC command that orders maintenance or a decrease in transmission power.

In the event the accumulated value of TPC commands exceeds the upper limit value, transmitting TPC commands to the radio base station will not raise the transmission power of the DL data channel and/or the DM-RS from the radio base station. So, the user terminal reduces the overhead in the UL by stopping transmitting TPC commands.

On the other hand, when the accumulated value of TPC commands is less than or equal to the upper limit value (step S302: "YES"), in step S304, the user terminal can transmit a TPC command that orders either an increase or a decrease in transmission power, to the radio base station.

<Second Example of Limitation>

In the second example of limitation, the user terminal judges whether or not to issue (transmit) TPC commands based on information that shows conditions for issuing TPC commands (hereinafter referred to as "issue condition information"), which is reported from the radio base station.

Figure 7:
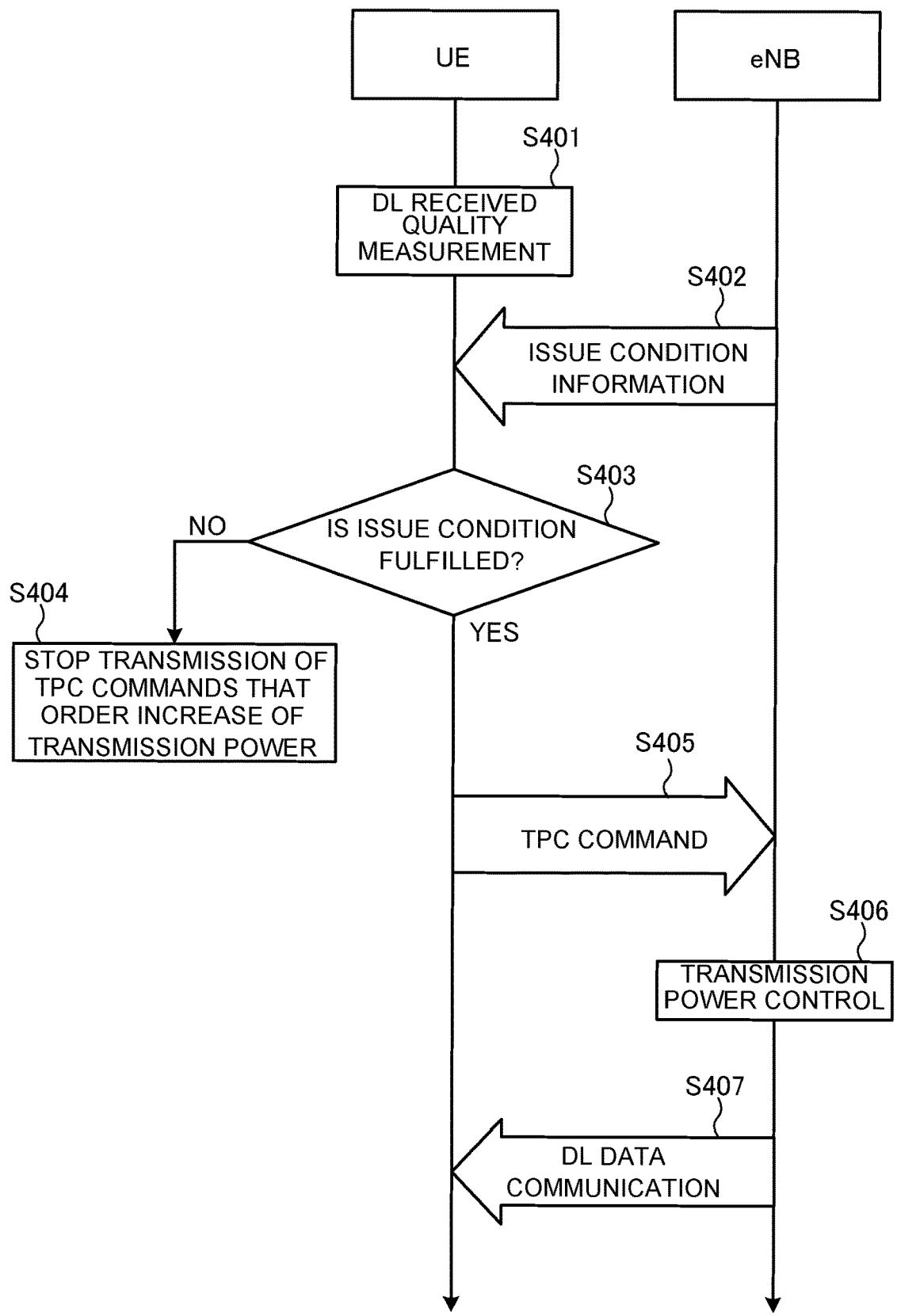
FIG. 7 is a diagram to show a second example of limiting issue of TPC commands, according to the third aspect.

FIG. 7 is a diagram to show a second example of limiting issue of TPC commands, according to the third aspect. Since steps S401 and S406 to S407 of FIG. 7 are the same as steps S101 and S104 to S105 of FIG. 2, their description will be omitted.

In step 402 of FIG. 7, the radio base station transmits issue condition information to the user terminal. This issue condition information may be transmitted to the user terminal using higher layer signaling and/or physical layer signaling. When physical layer signaling is used, the issue condition information may be transmitted in a DL control channel or a DL data channel, as part of the DCI.

Here, the condition for issuing TPC commands may be the condition for issuing TPC commands to order an increase in transmission power. Note that the TPC commands to order an increase in transmission power include TPC commands "3" and "4," which indicate "+1" and "+3," in the column "Command Value 1" in FIG. 3, and TPC command "4," which indicates "+1," in the column "Command Value 2."

Also, in the user terminal, an issue condition may be configured in advance to the effect that TPC commands to order an increase in transmission power can be issued in the event the packet error rate is equal to or less than a predetermined value (for example, $10^{-1}$) where the index that shows the modulation and coding scheme (MCS) (MCS index) applied to a DL data channel is a predetermined value X and the index that shows the number of layers applied to the DL data channel (rank index) is a predetermined value Y. In this case, issue condition information to represent this issue condition may be reported to the user terminal via higher layer signaling, and the predetermined value X and the predetermined value Y may be reported (as part of DCI) to the user terminal via physical layer signaling.

In step S403, the user terminal judges whether the condition for issuing TPC commands that order an increase in transmission power is fulfilled. If this issue condition is not fulfilled (step S403: "NO"), in step S404, the user terminal stops transmitting (issuing) TPC commands that order an increase of transmission power.

On the other hand, if the issue condition for commanding an increase in transmission power is fulfilled (step S403: "YES"), the user terminal sends a TPC command to order an increase in transmission power. Note that, even when the issue condition for ordering an increase in transmission power is not fulfilled, the user terminal may transmit a TPC command that order maintenance or a decrease in transmission power.

As shown in FIG. 7, the condition for issuing TPC commands that order an increase in transmission power from a radio base station to user terminals, so that it is possible to prevent a large number of user terminals communicating with the radio base station from requesting an increase in transmission power.

As described above, according to the third aspect, unnecessary transmission of TPC commands from user terminals is limited, so that the overhead in the UL can be reduced.

(Fourth Aspect)

In accordance with a fourth aspect of the present invention, control for modifying the reference value for DL received quality between radio base stations will be described. Note that the fourth aspect can be combined with at least one of the first to the third aspect, and, below, differences from the second aspect will be primarily described.

According to the fourth aspect, a radio base station may receive a message that requests modification of the above-described reference value in a non-specific or specific user terminal under the radio base station, from another radio base station, control transmission of reference value modification commands for the non-specific or specific user terminal based on this modification request message.

<Non-Specific User Terminals>

Now, referring to FIG. 8 to FIG. 11, control for modifying the reference values for DL received quality for non-specific user terminals under neighboring radio base stations, according to the fourth aspect, will be described. FIG. 8 are diagrams to show examples of interference between neighboring radio base stations #1 and #2 according to the fourth aspect. FIG. 9 is a diagram to show an example of control for modifying the reference values for non-specific user terminals according to the fourth aspect.

Figure 8A:
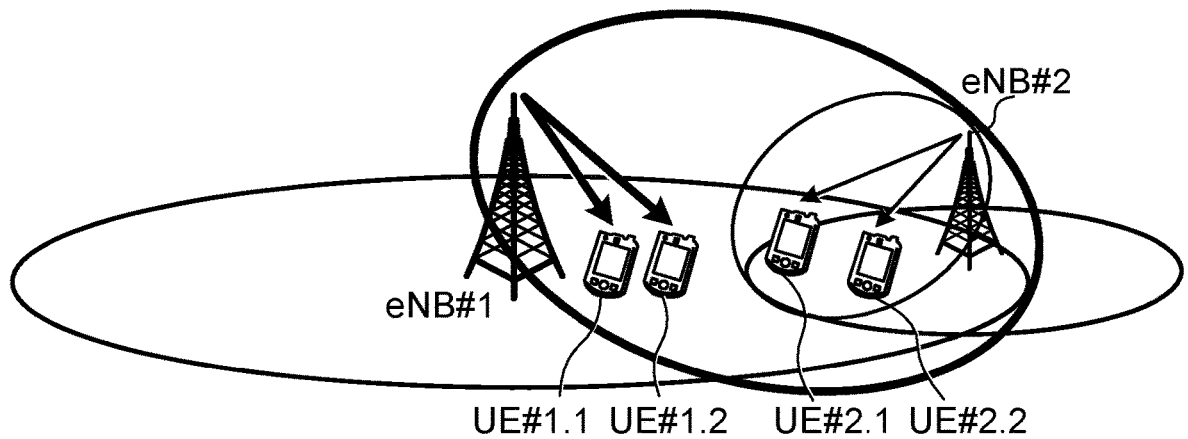
FIGS. 8A and 8B are diagrams to show examples of interference between neighboring radio base stations #1 and #2, according to a fourth aspect of the present invention.

In the case shown in FIG. 8A, radio base station #1 transmits DL data channels to user terminals #1.1 and #1.2, and radio base station #2 transmits DL data channels to user terminals #2.1 and #2.2. Although the case shown in FIG. 8A will be described here as an example, the number of radio base stations and user terminals is not limited to the examples shown in FIG. 8. Hereinafter, user terminals #1.1 and #1.2 will be collectively referred to as "user terminals #1" unless specified otherwise. User terminals #2.1 and #2.2 will be collectively referred to as "user terminals #2" unless specified otherwise.

In FIG. 8A, user terminals #2.1 and #2.2 under radio base station #2 are interfered with by the DL signals (for example, DL data channels) from radio base station #1 to user terminal #1.1 and #1.2. Consequently, the received quality in user terminals #2.1 and #2.2 deteriorates, and user terminals #2.1 and #2.2 each transmit a TPC command to radio base station #2 to order an increase in transmission power from radio base station #2.

In step S501 of FIG. 9, based on the accumulated value of TPC commands from each user terminal #2, radio base station #2 selects reference value modification request values (which indicate how much the reference value is raised or lowered) for all (non-specific) user terminals #1 under neighboring radio base station #1.

To be more specific, radio base station #2 may calculate the accumulated value of TPC commands per user terminal #2, and calculate a reference value modification request value based on the average value of each user terminal's accumulated value. Also, radio base station #2 may determine the above modification request value when TPC commands to order an increase in transmission power are received from a predetermined number or more of user terminals #2.

FIG. 10 is a diagram to show examples of reference value modification request values according to the fourth aspect. For example, as shown in FIG. 10, when the average value of the accumulated values of TPC commands in individual user terminals #2 is 10 dB or more, radio base station #2 may select the modification request value "−3 dB," and decide to lower the reference values of all user terminals #1 under radio base station #1 by "3 dB." Similarly, when this average value is 6 or more and less than 10, radio base station #2 may select the modification request value "−1 dB," and decide to lower the reference values of all user terminals #1 under radio base station #1 by "1 dB."

Also, when the average value is 3 or more and less than 6, radio base station #2 may select the modification request value "0," and decide to maintain (and not modify) the reference values of all user terminals #1 under radio base station #1. Also, when the average value is 0 or more and less than 3, radio base station #2 may select the modification request value "+1," and decide to raise the reference values of all user terminals under radio base station #1 by "1 dB." When the modification request value is "0" or "+1," the process from step S502 onward may be omitted.

For example, in FIG. 8A, the average value of the accumulated values of TPC commands in user terminals #2.1 and #2.2 under radio base station #2 is 10 or more, so that radio base station #1 may select the modification request value "−3 dB," and decide to lower the reference values of all user terminals #1 under radio base station #1 by "3 dB."

In step S502 of FIG. 9, radio base station #2 transmits a modification request message, which includes information representing the modification request value selected in step S501, to radio base station #1. Note that this modification request message may be transmitted via the X2 interface or via the Si interface.

Also, this modification request message may request that the reference value for a wide band be modified, or request the reference value for each subband be modified. The modification request message may contain modification request values, provided on a per frequency band basis, and the identification numbers of frequency bands that are designated by these modification request values.

In step S503, radio base station #1 looks at the modification request message from radio base station #2 and decides whether or not to modify the reference values of all user terminals #1. To be more specific, based on the modification request value contained in the modification request message and the average value of the accumulated values of TPC commands in individual user terminals #1 under radio base station #1, radio base station #1 may decide whether or not to modify the reference values of all user terminals #1 under control.

FIG. 11 is a diagram to show an example of judging whether or not to modify the reference value, according to the fourth aspect. For example, as shown in FIG. 11, when radio base station #1 receives information representing the modification request value "−3" from radio base station #2, if the average value of the accumulated values of TPC commands in individual user terminals under radio base station #1 is 6 dB or more, radio base station #1 may select the reference value modification request value "0 dB," and decide to maintain (and not modify) the reference values of all user terminals under radio base station #1 (step S504 in FIG. 9).

This is because, if the reference value for user terminal #1 under radio base station #1 is modified based on a modification request message from radio base station #2 while the average value of the accumulated values of TPC commands in individual user terminals under radio base station #1 is 6 dB or more, the required DL received quality for user terminal #1 may not be fulfilled.

On the other hand, even when radio base station #1 receives information representing the modification request value "−3 dB" from radio base station #2, if the average value of the accumulated values of TPC commands in individual user terminals #1 under radio base station #1 is 3 dB or more and less than 6 dB, radio base station #1 may select the reference value modification request value "−1 dB," and decide to lower the reference values of all user terminals #1. Also, when this average value is 0 or more and less than 3, radio base station #1 may select the modification request value "−3 dB," which is requested from radio base station #2, as the modification request value for all user terminals #1.

When the average value of the accumulated values of TPC commands in individual user terminals #1 under radio base station #1 is less than 6 dB, modifying the reference value for a user terminal #1 based on a modification request message from radio base station #2 is likely to have little impact on the DL received quality of this user terminal #1.

In step S505 of FIG. 9, radio base station #1 transmits reference value modification commands, generated based on the modification request message from radio base station #2, to all user terminals #1 (step S505). For example, when information representing the modification request value "−3 dB" is received from radio base station #2 and the average value of the accumulated values of TPC commands in individual user terminals under radio base station #1 is 3 dB or more and less than 6 dB, radio base station #1 transmits reference value modification commands that order to lower the reference values by "1 dB."

In this case, the reference value modification command "1" indicating "−1 dB" (see the column "Command Value 1" in FIG. 5) is transmitted to each user terminal #1. In this way, radio base station #1 may transmit a reference value modification command that command a value (here, "−1 dB") that is different from the modification request value from radio base station #2 (here, "−3 dB") to each user terminal #1.

In step S506, radio base station #1 transmits a response message to the modification request message from radio base station #2, to radio base station #2. "1" ("modified)" or "0" ("unmodified") is configured in a specific field in the response message. Note that a response message to indicate that the reference value has been modified (that is, "1" ("modified") is configured in a specific field) may be transmitted after step S507.

Steps S507 to S512 of FIG. 9 are the same as steps S202 to S207 of FIG. 4, so their description will be omitted.

Figure 8B:
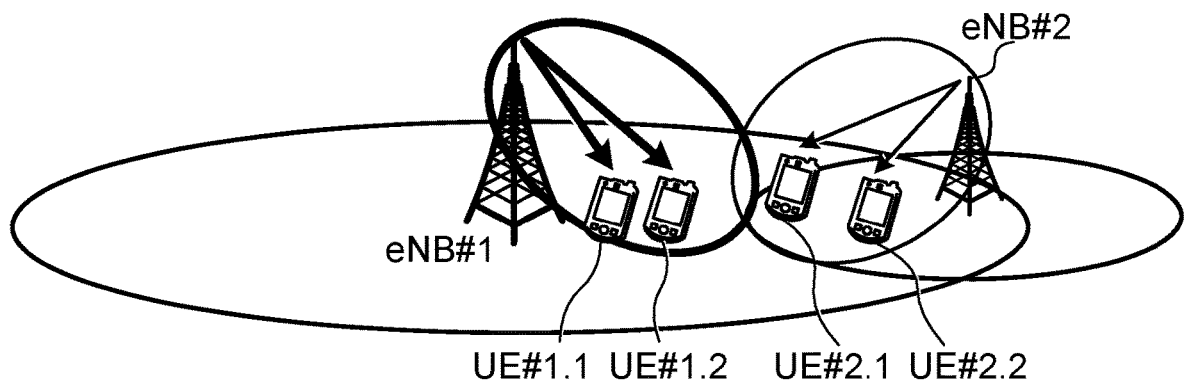
Figure 9:
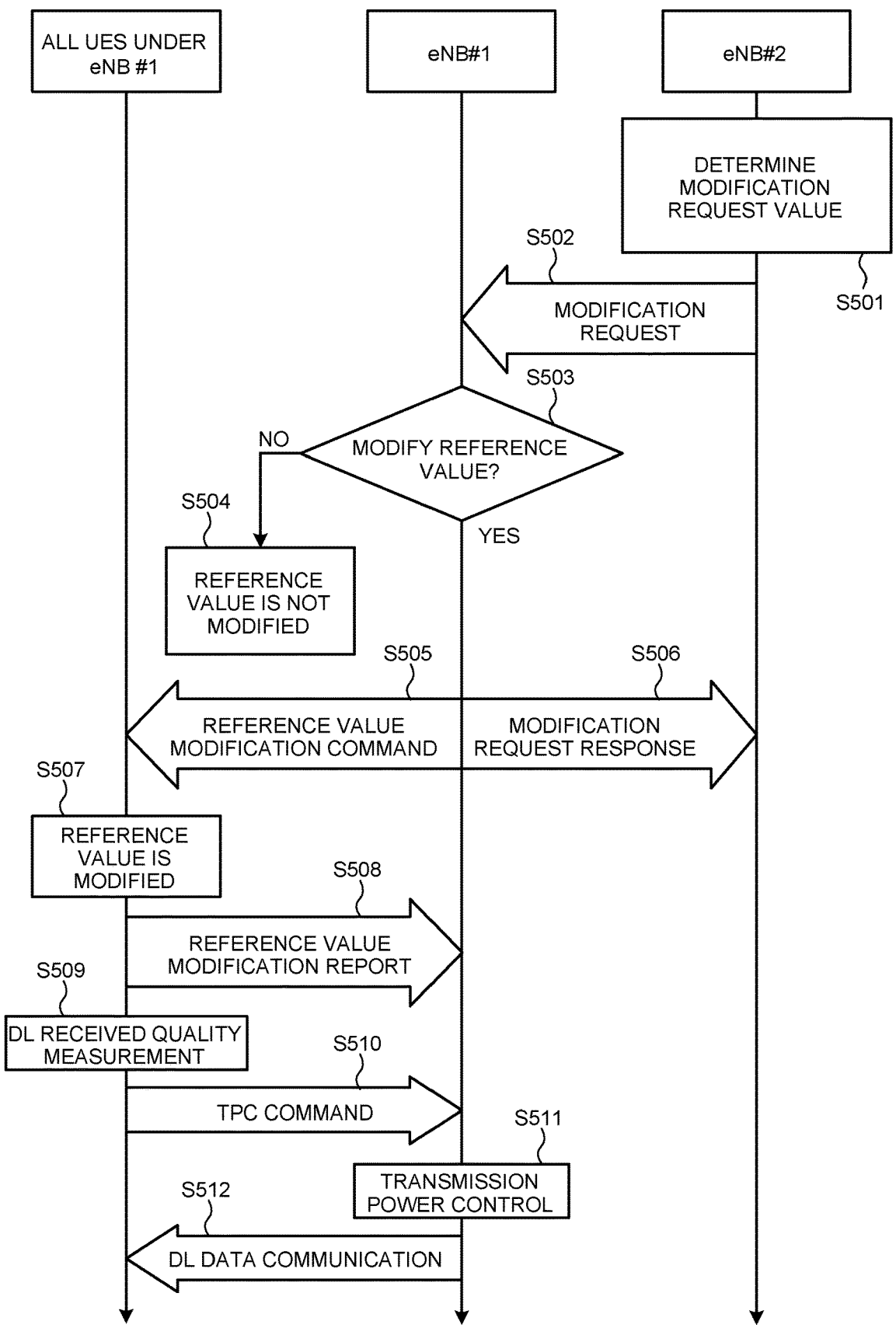
FIG. 9 is a diagram to show an example of control for modifying the reference value for an unspecific user terminal according to the fourth aspect.

As described above, when the reference values for all user terminals #1 under radio base station #1 are modified in response to a modification request message from radio base station #2, the transmission power of DL data channels from radio base station #1 to each user terminal #1 is controlled. As a result of this, as shown in FIG. 8B, the transmission power for user terminal #1.1 or #1.2 from radio base station #1 is reduced compared to FIG. 8A, so that interference in user terminals #2.1 and #2.2 under radio base station #2 can be reduced.

<Specific User Terminals>

Next, referring to FIG. 12 to FIG. 14, control for modifying the reference values for specific user terminals under neighboring radio base stations according to the fourth aspect will be described. FIG. 12 are diagrams to show other examples of interference between neighboring radio base stations #1 and #2 according to the fourth aspect. FIG. 13 is a diagram to show an example of control for modifying the reference values for specific user terminals according to the fourth aspect. Note that differences from the above-described control for modifying the reference values for non-specific user terminals will be primarily described below.

Figure 12A:
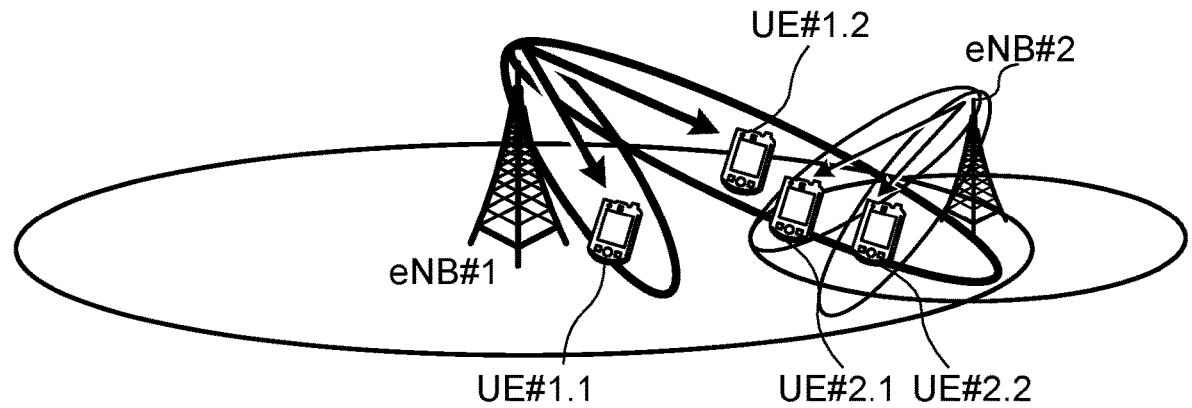
FIGS. 12A and 12B are diagrams to show other examples of interference between neighboring radio base stations #1 and #2 according to the fourth aspect.
Figure 13:
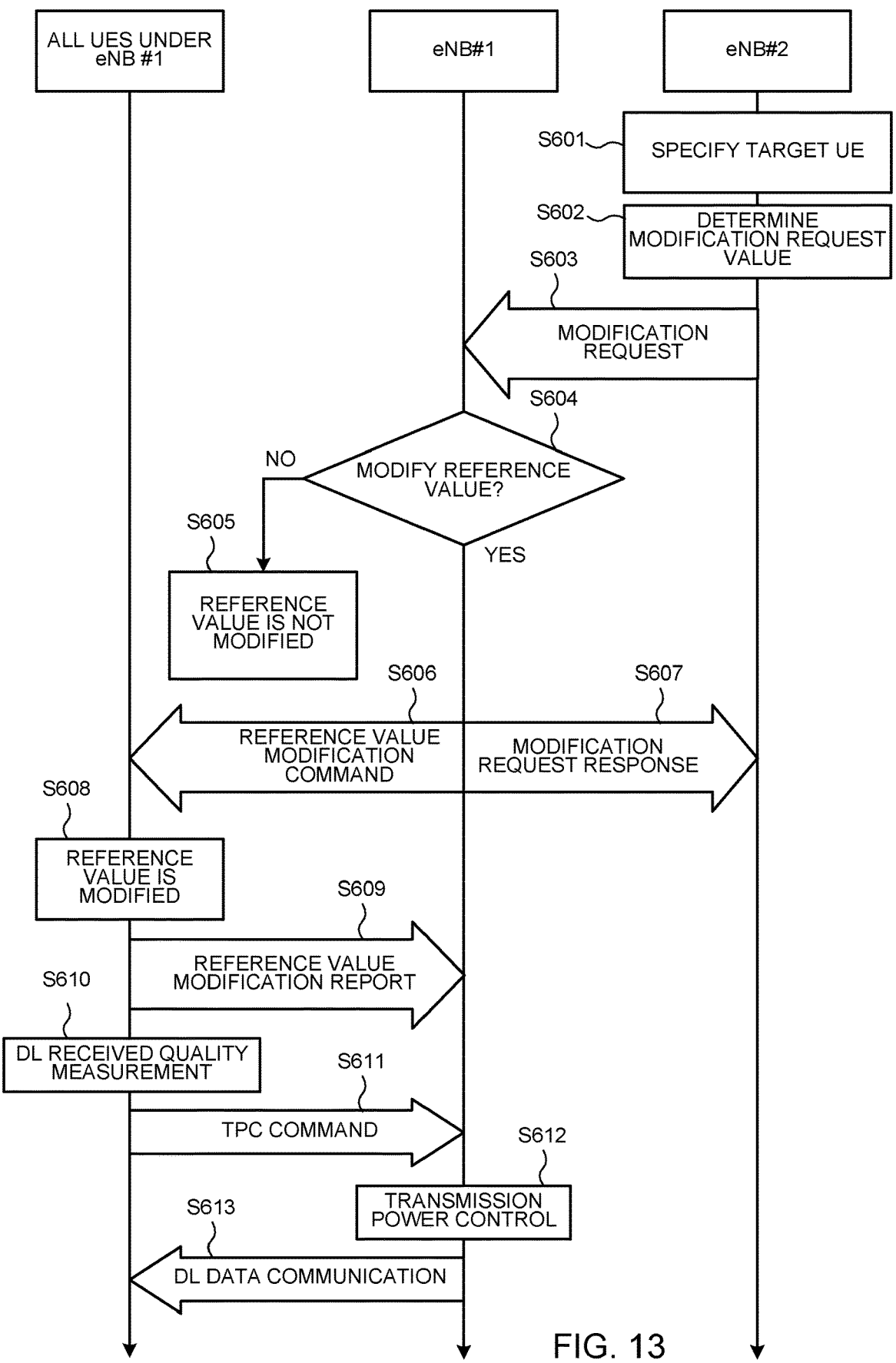
FIG. 13 is a diagram to show an example of control for modifying the reference value for a specific user terminal according to the fourth aspect.

As shown in FIG. 12A, when radio base stations #1 and #2 execute beamforming (also referred to as "massive MIMO (Multiple Input Multiple Output)," and/or others), interference from beams from neighboring radio base stations, addressed to specific user terminals, is anticipated to increase.

For example, referring to FIG. 12A, user terminals #2.1 and #2.2 under radio base station #2 are interfered with by the beam-formed DL signal (for example, a DL data channel) from radio base station #1 to user terminal #1.2. Consequently, the received quality in user terminals #2.1 and #2.2 deteriorates, and user terminals #2.1 and #2.2 each transmit, to radio base station #2, a TPC command for ordering an increase in transmission power from radio base station #2.

In step S601 of FIG. 13, radio base station #2 specifies the target user terminal (target UE) being the cause of interference, out of user terminals #2.1 and #2.2. To be more specific, radio base station #2 may specify the target user terminal based on at least one of the beam patterns, the locations, the frequency bands, the cells and the sectors of the user terminals that have transmitted the TPC commands (here, user terminals #2.1 and #2.2).

Figure 14:
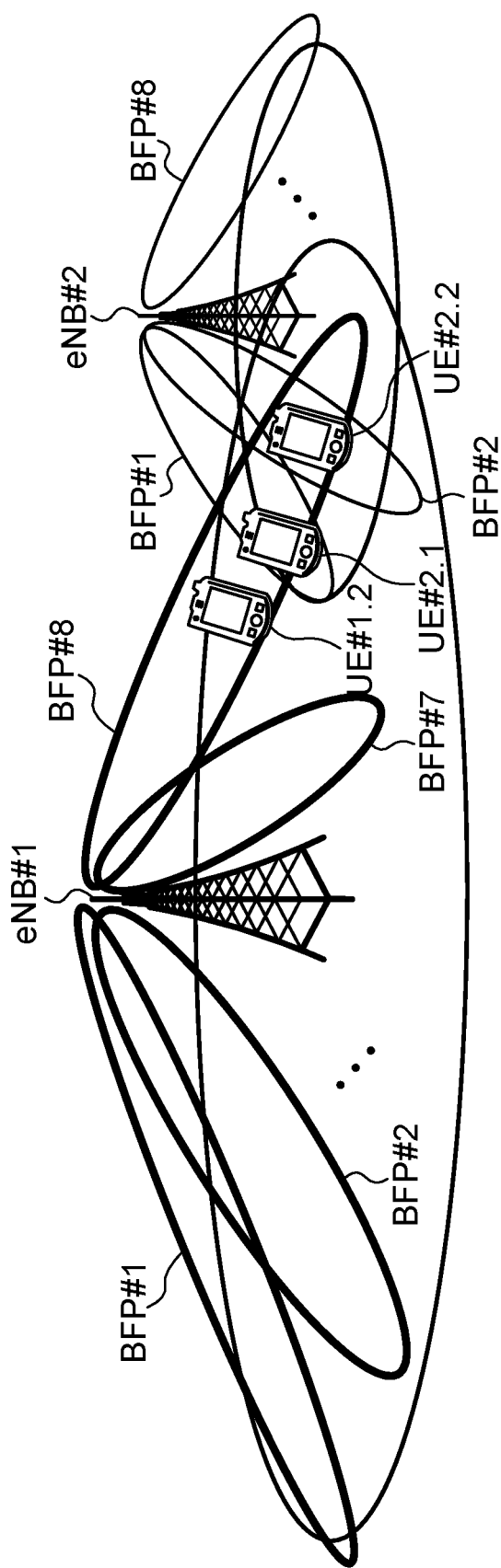
FIG. 14 is a diagram to show an example of a method for identifying a target user terminal according to the fourth aspect.

FIG. 14 is a diagram to show an example of the method of specifying a target user terminal according to the fourth aspect. As shown in FIG. 14, a predetermined number of beamforming patterns (BFPs) are pre-configured in each radio base station. Also, where there are neighboring radio base stations, each radio base station shares information as to which neighboring base stations' BFPs interfere with the subject radio base station's BFP. Furthermore, between neighboring radio base stations, information to indicate the user terminals using each BFP may be shared.

For example, referring to FIG. 14, eight kinds of BFPs turned in different directions in cells are configured in advance. Information to indicate that BFP #8 of radio base station #1 interferes with BFP #1 or #2 of radio base station #2 is shared between neighboring radio base stations #1 and #2. In addition, information to indicate that BFP #8 of radio base station #1 is used in user terminal #1.2, BFP #1 of radio base station #2 is used in user terminal #2.1, and BFP #2 of radio base station #2 is used in user terminal #2.2, may be shared between neighboring radio base stations #1 and #2.

Referring to FIG. 14, when radio base station #2 receives TPC commands ordering an increase in transmission power from user terminal #2.1 using BFP #1 and user terminal #2.2 using BFP #2, radio base station #2 can estimate that BFP #8 from radio base station #1 is interfering with user terminals #2.1 and #2.2 using BFPs #1 and #2. This is because it is known that BFPs #1 and #2 of radio base station #2 interfere with BFP #8 from radio base station #1. Radio base station #2 specifies user terminal #1.2 communicating with BFP #8 as the target user terminal being the source of interference in user terminals #2.1 and #2.2.

In step S602 of FIG. 13, the reference value modification request value in user terminal #1.2, specified as the target user terminal, is determined. For example, radio base station #2 can determine the modification request value based on the accumulated value of TPC commands in each of user terminals #2.1 and #2.2 (see FIG. 10).

In step S603 of FIG. 13, radio base station #2 transmits a modification request message for the reference value for the target user terminal, to radio base station #1. FIG. 15 is a diagram to show an example of a modification request message according to the fourth aspect. As shown in FIG. 15, the modification request message may contain information that represents the modification request value (for example, one of the numbers {1, 2, 3, 4} representing the modification request values {−1, 0, +1, +3}), identification information of the target user terminal, identification information of the frequency band used by the target user terminal (for example, identification information of a wideband and/or each subband) and identification information of the cell (or sector) where the target user terminal communicates.

Note that the target user terminal has only to be specified by at least one of the identification information of the target user terminal (UE-ID), frequency band identification information (frequency band ID), cell identification information (cell ID), and and sector identification information (sector ID). For example, if the target user terminal is identified by the identification information of the frequency band, the UE-ID, the cell ID and the sector ID need not be included in the modification request message. In other words, the modification request message has only to contain information that is needed to specify the target user terminal.

Steps S604 to S613 of FIG. 13 are the same as steps S503 to S512 of FIG. 9 except that the target of receiving reference value modification control is limited to a specific user terminal (target user terminal) under radio base station #1, so their description will be omitted.

Figure 12B:
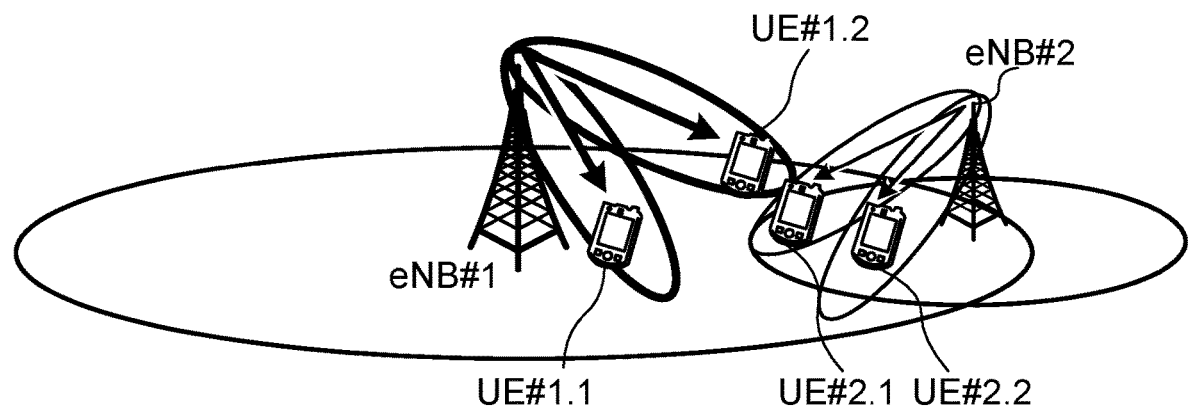

As described above, when the reference value for a specific user terminal (here, user terminal #1.2) under radio base station #1 is modified lower in response to a modification request message from radio base station #2, the transmission power of the DL data channel from radio base station #1 to user terminal #1.2 decreases. As a result of this, as shown in FIG. 12B, the transmission power from radio base station #1 to user terminal #1.2 is reduced compared to FIG. 12A, so that interference in user terminals #2.1 and #2.2 under radio base station #2 can be reduced.

(Operation/Effect)

Figure 16A:
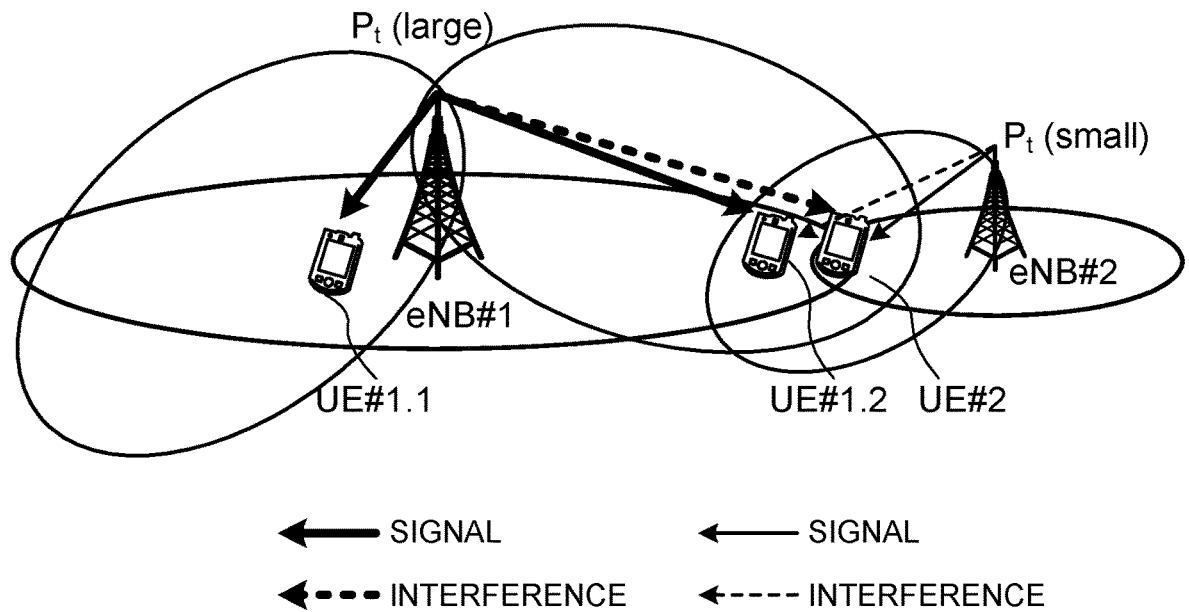
FIGS. 16A and 16B are diagrams to show examples of operations and effects of radio communication methods according to the present embodiment.
Figure 16B:
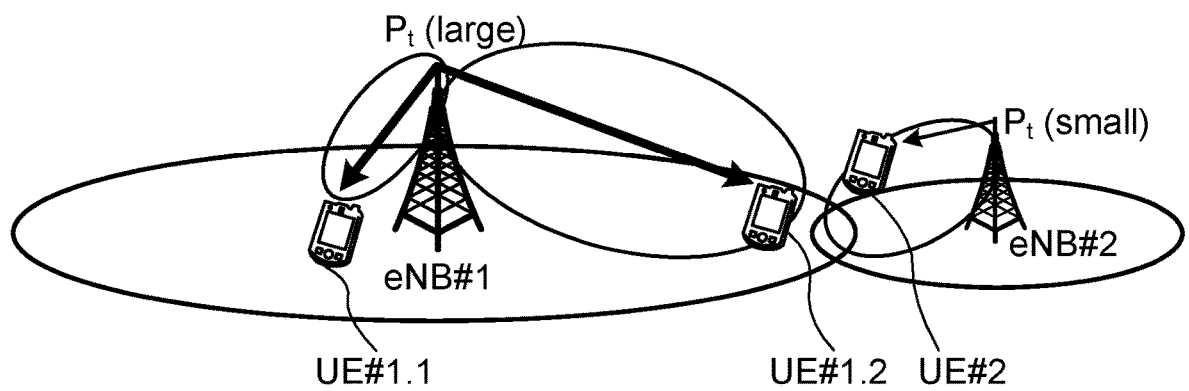

Referring to FIG. 16, the operation and effect of the radio communication method according to the present embodiment will be explained. FIG. 16 provide diagrams to show examples of operations and effects of the radio communication method according to the present embodiment. As shown in FIG. 16A, when transmission power control for DL data channels and/or DM-RSs is not executed in radio base stations #1 and #2, the received quality in cell-edge user terminals #1.2 and #2 deteriorates. On the other hand, as shown in FIG. 16B, when transmission power control for DL data channels and/or DM-RSs is executed in radio base stations #1 and #2, the received quality of cell-edge user terminals #1.2 and #2 can be improved.

The operations and effects shown in FIG. 16 can be achieved at least by the radio communication method according to the first aspect. By combining at least one of the second to the fourth aspect with the first aspect, it is possible to achieve the operations and effects shown in FIG. 16 even more effectively.

(Radio Communication System)

Now, the structure of a radio communication system according to an embodiment of the present invention will be described below. In this radio communication system, communication is performed using one or a combination of the radio communication methods according to the above aspects of the present invention.

Figure 17:
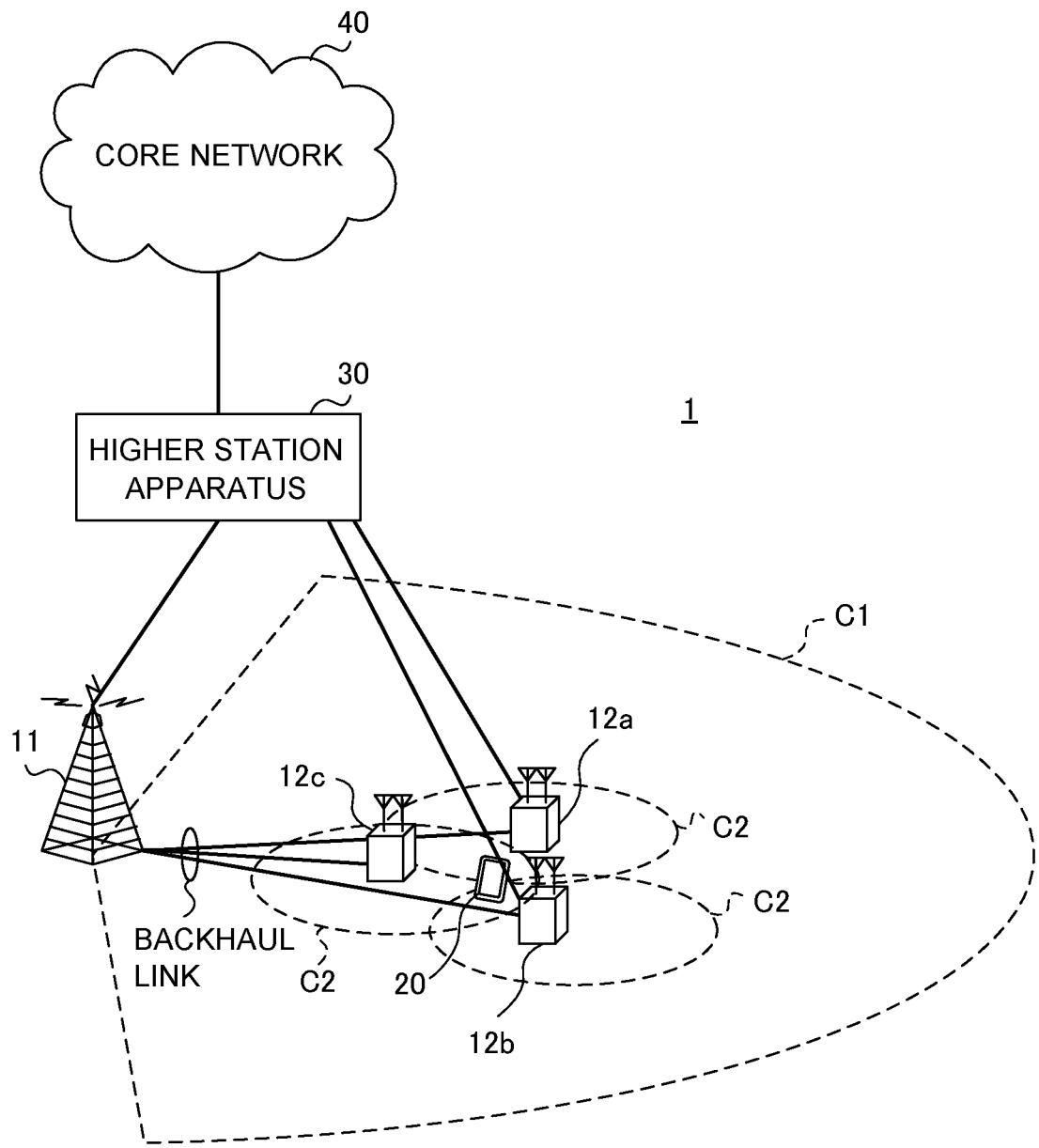
FIG. 17 is a diagram to show an example of a schematic structure of a radio communication system according to the present embodiment.

FIG. 17 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "5G+(5G plus)," "FRA (Future Radio Access)," "New-RAT (Radio Access Technology)" and so on, or may be seen as a system to implement these.

The radio communication system 1 shown in FIG. 17 includes a radio base station 11 that forms a macro cell C1, which covers a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a DL data channel (for example, a PDSCH (Physical Downlink Shared CHannel) that is shared by each user terminal 20), a broadcast channel (PBCH (Physical Broadcast CHannel)), a DL control channel and so on are used as downlink channels. User data, higher layer control information and SIBs (System Information Blocks) are communicated in DL data channel. Also, the MIB (Master Information Block) is communicated in a broadcast channel.

The DL control channels (also referred to as "L1/L2 control channels") include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including scheduling information of the DL data channel and the UL data channel is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the UL data channel is communicated by the PHICH. The EPDCCH is frequency-division-multiplexed with the DL data channel and used to communicate DCI and so on, like the PDCCH.

In the radio communication system 1, a UL data channel (for example, a PUSCH (Physical Uplink Shared CHannel) that is shared by each user terminal 20), a UL control channel (PUCCH (Physical Uplink Control CHannel)), an initial access channel (also referred to as a "random access channel," and is, for example, a PRACH (Physical Random Access CHannel)) and so on are used as uplink channels. At least one of user data, higher layer control information and uplink control information (UCI) is communicated by the UL data channel. Also, UCI such as DL radio quality information (CQI: Channel Quality Indicator) and delivery acknowledgment information are communicated using the UL control channel. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS) and so on are communicated as DL reference signals. Also, in the radio communication system 1, measurement reference signals (SRSs: Sounding Reference Signals), UE-specific reference signals (DMRSs) and so on are communicated as UL reference signals. Note that DMRSs may be referred to as "user terminal-specific reference signals (UE-specific Reference Signals)." Also, the reference signals to be communicated are by no means limited to these.

<Radio Base Station>

Figure 18:
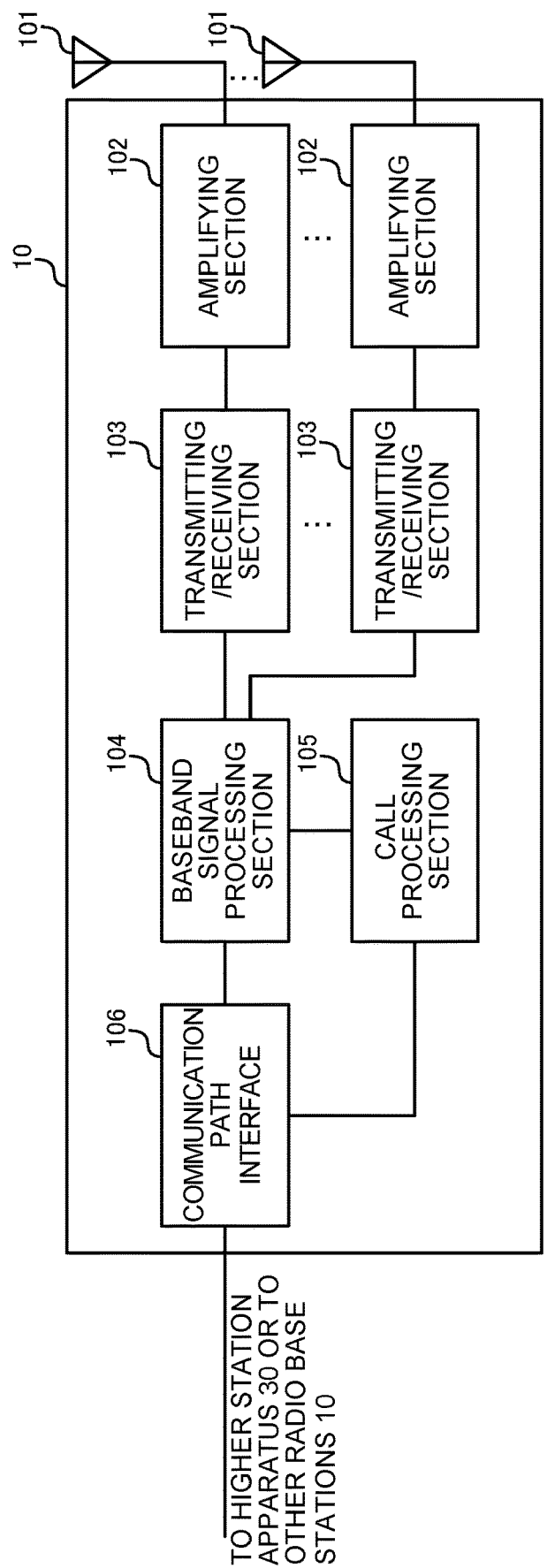
FIG. 18 is a diagram to show an example of an overall structure of a radio base station according to the present embodiment.

FIG. 18 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 through DL is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals (DL control channels), DL data signals (DL data channels), DL reference signals (DM-RS, CSI-RS, CRS and so on), discovery signals, synchronization signals, broadcast signals and so on), and receive UL signals (for example, UL control signals (UL control channels), UL data signals (UL data channels), UL reference signals and so on).

To be more specific, the transmitting/receiving sections 103 transmits a DM-RS that is specific to a user terminal 20 and the DL data channel demodulated using this DM-RS, to the user terminal 20. The transmitting/receiving sections 103 also receive, from the user terminal 20, TPC commands that are for use in controlling the transmission power of the DL data channel and/or the DM-RS.

Also, the communication path interface 106 transmits and receives messages that request modification of DL received quality reference values for non-specific or specific user terminals 20, to and from the other radio base station 10. In addition, the communication path interface 106 may transmit/receive response messages to modification request messages with other radio base stations 10.

The transmission section and the receiving section of the present invention are comprised of a transmitting/receiving section 103 and/or a communication path interface 106.

Figure 19:
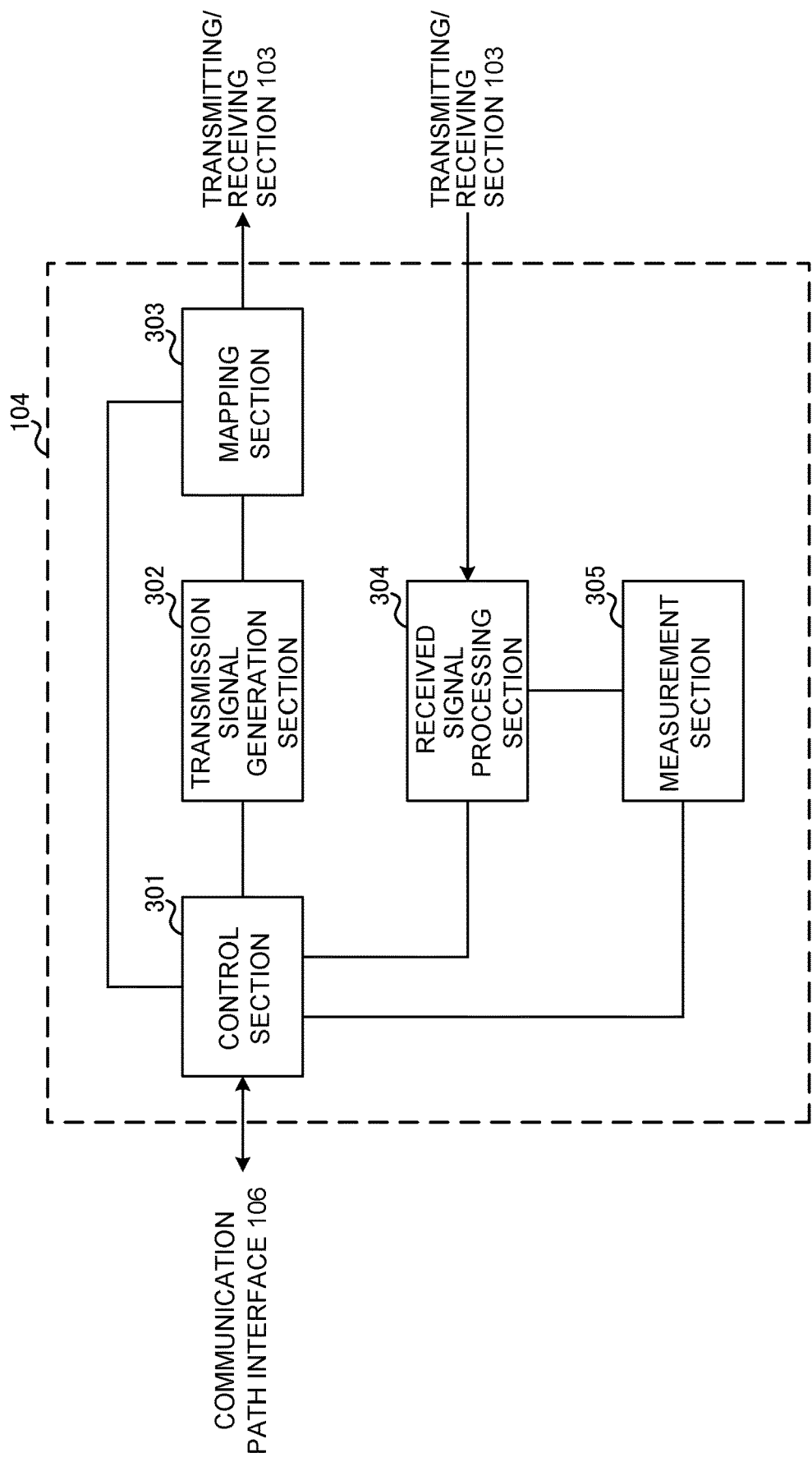
FIG. 19 is a diagram to show an example of a functional structure of a radio base station according to the present embodiment.

FIG. 19 is a diagram to show an example of a functional structure of a radio base station according to the present embodiment. Note that, although FIG. 19 primarily shows functional blocks that pertain to characteristic parts of the present embodiment, the radio base station 10 has other functional blocks that are necessary for radio communication as well. As shown in FIG. 19, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

The control section 301 controls the transmission power of a DL data channel and/or a DM-RS. To be more specific, the control section 301 can control the transmission power of a DL data channel and/or a DM-RS based on TPC commands from the user terminal 20 (first aspect). The control section 301 can make the transmission power of the DL data channel be the same as, or have a predetermined power gap from, the transmission power of the DM-RS.

For example, the control section 301 controls the transmission power of the DL data channel and/or the DM-RS based on at least one of TPC commands, the maximum transmission power of the DL data channel, the bandwidth (for example, the number of PRBs) allocated to the DL data channel for the user terminal, and the power ratio between the DL data channel and the DM-RS (for example, see equations 1 and 2 above).

Alternatively, the control section 301 may control the transmission power of the DL data channel irrespective of TPC commands from the user terminal 20 (first aspect). Note that the control section 301 may determine whether or not to use TPC commands depending on what type of reference signal is used to demodulate the DL data channel. For example, the control section 301 may not use TPC commands when the DL data channel is demodulated using a CRS, but use TPC commands when the DL data channel is demodulated using a DM-RS.

Also, the control section 301 may control modification of the reference value for DL received quality, which is used to generate TPC commands. To be more specific, the control section 301 may control the transmission signal generation section 302, the mapping section 303 and the transmitting/receiving sections 103 to generate and transmit reference value modification commands (modification commands) (second aspect).

Also, the control section 301 may control the transmission signal generation section 302, the mapping section 303 and the transmitting/receiving sections 103 to generate and transmit information regarding the condition for issuing TPC commands in the user terminal 20 (third aspect).

Also, based on the accumulated values of TPC commands from user terminals 20 connected to the radio base station 10, the control section 301 may control the communication path interface 106 to transmit a message for requesting modification of the reference value for DL received quality to another radio base station 10 (fourth aspect). Also, the control section 301 may determine the modification request values based on the average value of the accumulated values of TPC commands from the user terminals 20 (FIG. 10).

The modification request message may be directed to a non-specific user terminal 20 that is connected to another radio base station 10 (FIG. 8 to FIG. 9), or may be directed to a specific user terminal 20 (FIG. 12 to FIG. 15). The control section 301 may specify the specific user terminal 20 (target user terminal) connected to another radio base station 10 based on at least one of the beam patterns, locations, frequency bands, cells and sectors of the user terminal 20 that transmitted the TPC command.

In addition, the control section 301 may control transmission of reference value modification commands for non-specific or specific user terminals 20 under the control of the radio base station 10 based on a modification request message from another radio base stations 10 (fourth aspect). For example, the control section 301 may control transmission of reference value modification commands based on the modification request values shown in the modification request message and the average value of the accumulated values of TPC commands in non-specific or specific user terminal 20 under the radio base station 10 (FIG. 11).

The transmission signal generation section 302 generates DL signals (DL control channels, DL data channels, DL reference signals such as DM-RSs, etc.) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, UL signals that are transmitted from the user terminals 20 (UL control channels, UL data channels, UL reference signals, and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a TPC command is received, the TPC command is output to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 20:
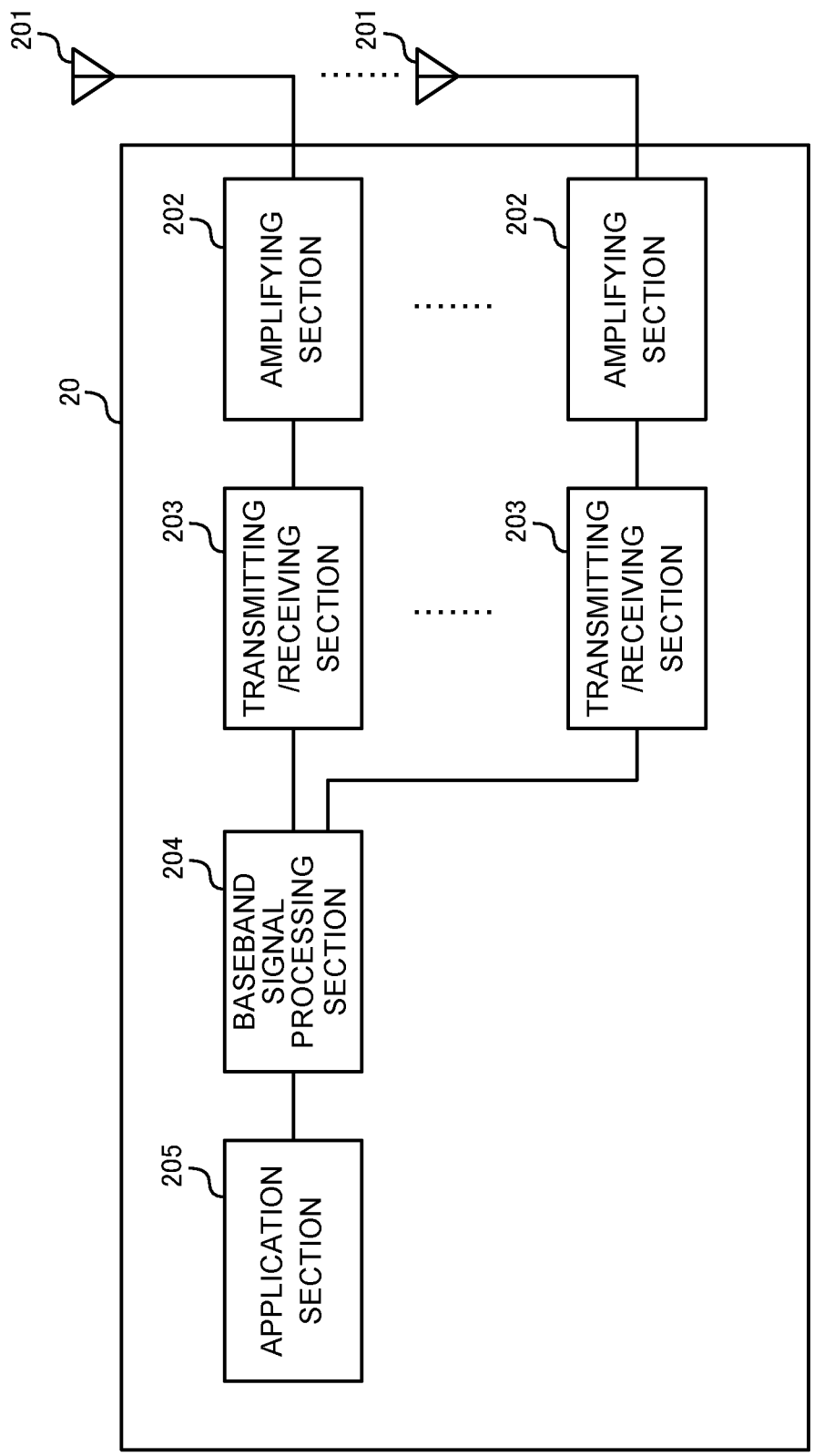
FIG. 20 is a diagram to show an example of an overall structure of a user terminal according to the present embodiment.

FIG. 20 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals (DL control channels), DL data signals (DL data channels), DL reference signals (DM-RS, CSI-RS, CRS and so on), discovery signals, synchronization signals, broadcast signals and so on), and transmit UL signals (for example, UL control signals (UL control channels), UL data signals (UL data channels), UL reference signals and so on).

To be more specific, the transmitting/receiving sections 203 receive a DM-RS that is specific to a user terminal 20 and the DL data channel demodulated using this DM-RS. The transmitting/receiving sections 203 also transmit TPC commands that are for use in controlling the transmission power of the DL data channel and/or the DM-RS.

Figure 21:
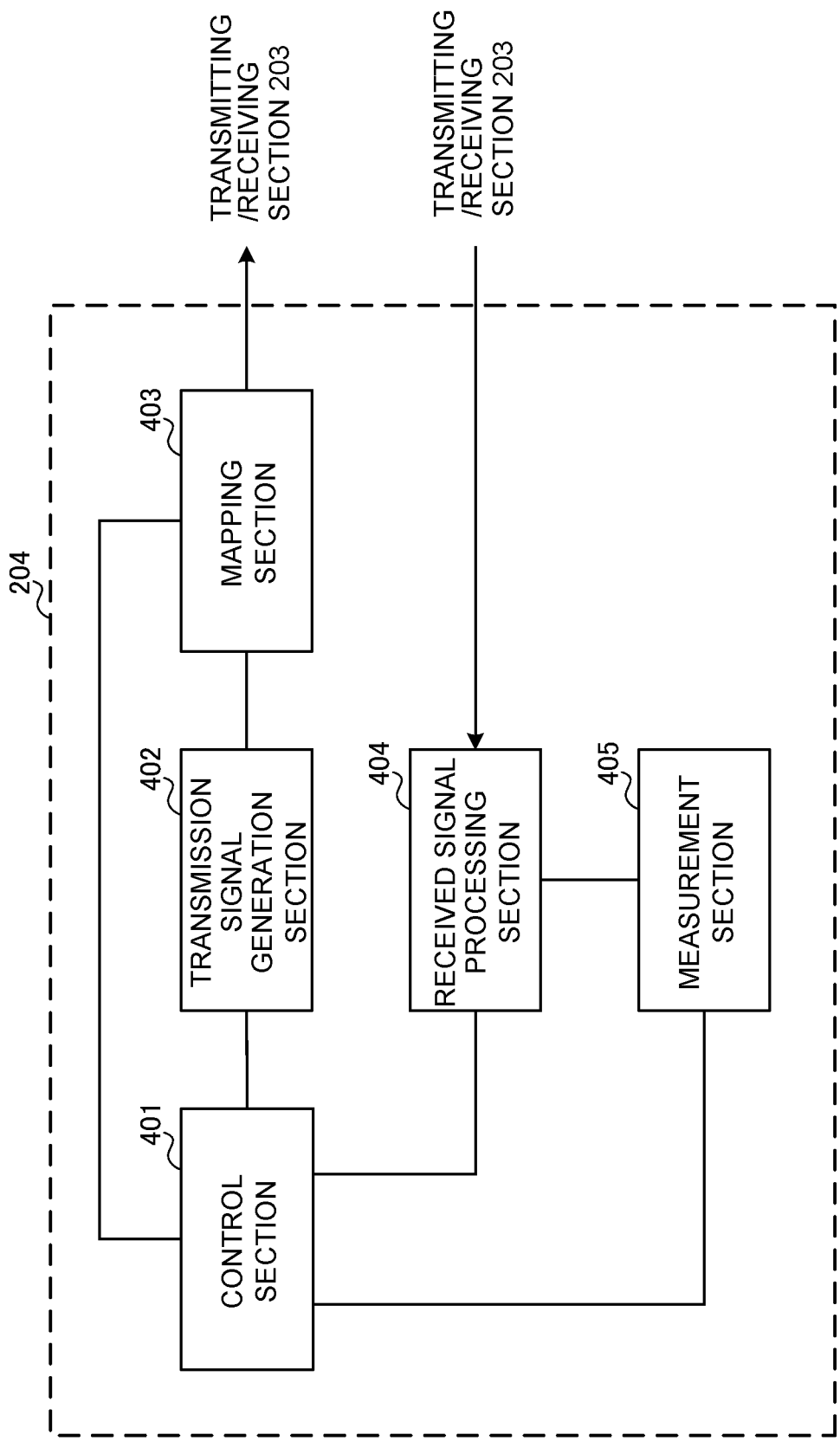
FIG. 21 is a diagram to show an example of a functional structure of a user terminal according to the present embodiment.

FIG. 21 is a diagram to show an example of a functional structure of a user terminal according to the present embodiment. Note that, although FIG. 21 primarily shows functional blocks that pertain to characteristic parts of the present embodiment, the user terminal 20 has other functional blocks that are necessary for radio communication as well. As shown in FIG. 21, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires a DL control channel and a DL data channel transmitted from the radio base station 10 from the received signal processing section 404. To be more specific, the control section 401 controls the transmitting/receiving sections 203 and the received signal processing section 404 to blind-decode a DL control channel to detect DCI, and to receive a DL data channel based on the DCI. In addition, the control section 401 estimates channel gain based on the DM-RS or the CRS, and demodulates the DL data channel based on the estimated channel gain.

The control section 401 controls generation of feedback signals (for example, HARQ-ACK and/or the like), UL data channels and so on, based on whether or not retransmission control is necessary, which is decided in response to the DL control channel, the DL data channel and so on.

The control section 401 also controls transmission of TPC commands used to control the transmission power of the DL data channel and/or the DM-RS (first aspect). To be more specific, the control section 401 controls the transmission signal generation section 402 so as to generate TPC commands based on results of comparing DL received quality measured in the measurement section 405 with reference values. TPC commands may be transmitted in either the UL data channel or the UL control channel.

In addition, the control section 401 controls the reference value for DL received quality based on reference value modification commands from the radio base station 10 (second and fourth aspects). To be more specific, the control section 401 controls the transmission signal generation section 402 to generate TPC commands based on reference values, which are controlled based on reference value modification commands.

Furthermore, the control section 401 may stop transmission of TPC commands that order an increase in transmission power when a predetermined condition is fulfilled (third aspect). For example, when the accumulated value of TPC commands that have been issued by the user terminal 20 itself exceeds an upper limit value, the control section 401 may stop transmitting TPC commands that order an increase in transmission power (FIG. 6). Alternatively, the control section 401 may stop transmission of TPC commands that order increased transmission power if the issue condition reported from the radio base station 10 is not fulfilled (FIG. 7).

The transmission channel generation section 402 generates UL signals (UL control channels, UL data channels, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates TPC commands based on, for example, commands from the control section 401. Also, the transmission signal generation section 402 generates UL data channels based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals transmitted from the radio base station 10 (DL control channels, DL data channels, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or reception of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), the channel states and so on of the received signals. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 22:
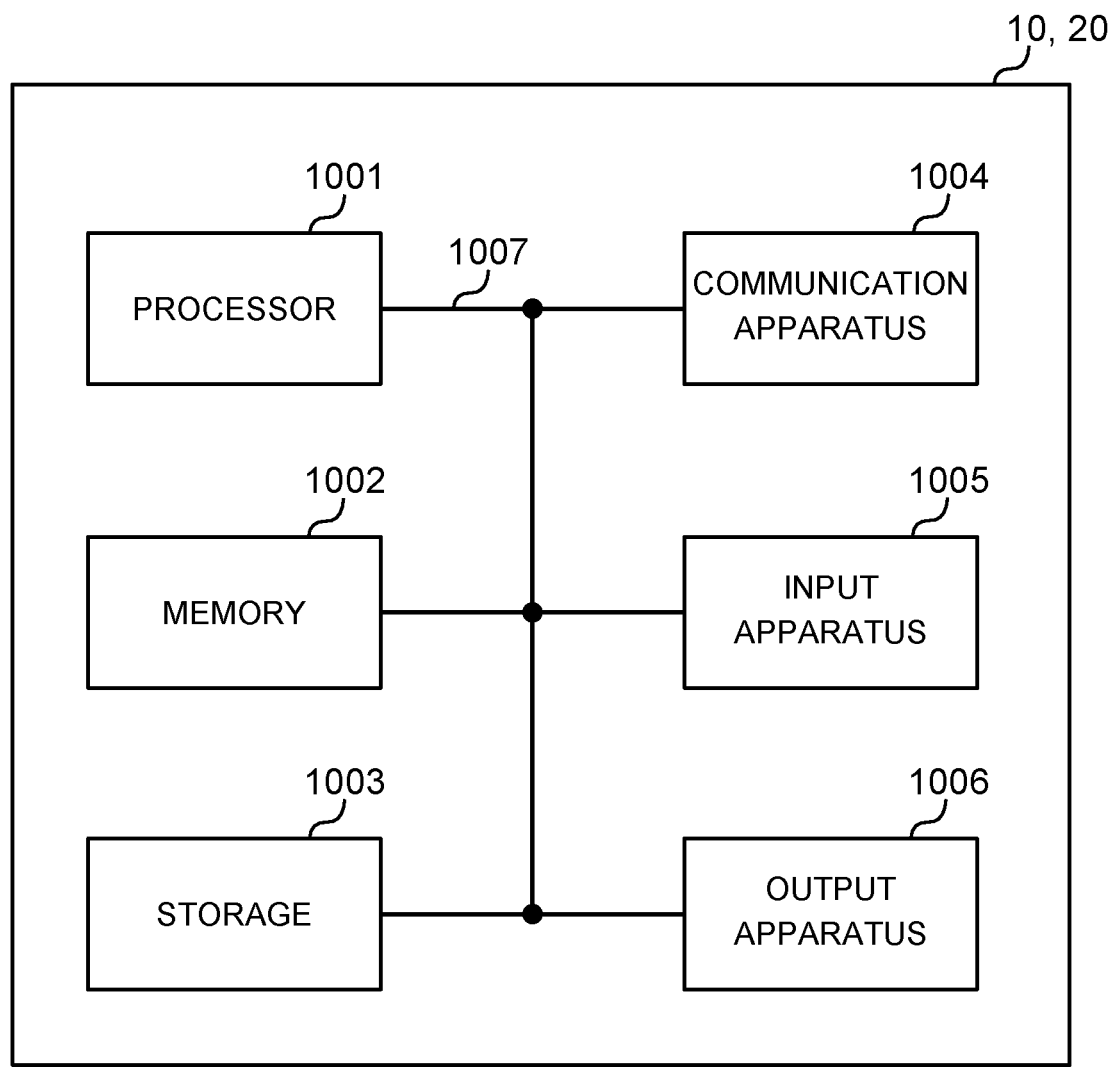
FIG. 22 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 22 is a diagram to show an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory (primary storage apparatus)" and so on. The memory 1002 can store executable programs (program codes), software modules and the like for implementing the radio communication methods according to present embodiment.

The storage 1003 is a computer-readable recording medium, and is configured with at least one of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this.

A TTI having a time duration of one ms may be referred to as a "normal TTI (TTI in LTE Rel. 8 to 12)," a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

The aspects/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the aspects/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-072046, filed on Mar. 31, 2016, including the specification, drawings and abstract, is incorporated herein by reference in its entirety.

The invention claimed is:

1. A user terminal comprising:
a receiver that receives a downlink (DL) data channel which is demodulated using a user terminal-specific reference signal;
a transmitter that transmits a transmission power control (TPC) command which is used to control transmission power of the DL data channel and/or the reference signal; and
a processor that controls transmission of the TPC command,
wherein the processor stops transmission of the TPC command that orders an increase in the transmission power when an accumulated value of the TPC commands exceeds an upper limit value.

2. The user terminal according to claim 1, wherein:
the receiver receives a modification command for modifying a reference value for downlink (DL) received quality; and
the processor generates the TPC command based on the reference value which is controlled based on the modification command.

3. A radio base station comprising:
a transmitter that transmits, to a user terminal, a downlink (DL) data channel which is demodulated using a user terminal-specific reference signal;
a receiver that receives a transmission power control (TPC) command from the user terminal; and
a processor that controls transmission power of the DL data channel and/or the reference signal based on the TPC command,
wherein the user terminal stops transmission, to the radio base station, of the TPC command that orders an increase in the transmission power when an accumulated value of the TPC commands exceeds an upper limit value.

4. The radio base station according to claim 3, wherein the transmitter transmits, to the user terminal, a modification command for modifying a reference value for downlink (DL) received quality which is used to generate the TPC command.

5. The radio base station according to claim 4, wherein:
the receiver receives a modification request message that requests modification of the reference value in a non-specific or specific user terminal, from another radio base station; and
the processor controls transmission of the modification command of the reference value for the non-specific or specific user terminal based on the modification request message.

6. A radio communication method comprising:
in a user terminal,
receiving a downlink (DL) data channel which is demodulated using a user terminal-specific reference signal;
transmitting a transmission power control (TPC) command;
controlling transmission power of the DL data channel and/or the reference signal based on the TPC command; and
stopping transmission of the TPC command that orders an increase in the transmission power when an accumulated value of the TPC commands exceeds an upper limit value.

* * * * *